(12) United States Patent
Sako et al.

(10) Patent No.: US 8,756,709 B2
(45) Date of Patent: Jun. 17, 2014

(54) APPARATUS FOR, AND METHOD OF, RECORDING/PLAYING AUDIO DATA HAVING ADDITIONAL INFORMATION EMBEDDED THEREIN

(75) Inventors: Yoichiro Sako, Tokyo (JP); Shunsuke Furukawa, Tokyo (JP); Tatsuya Inokuchi, Tokyo (JP); Takashi Kihara, Chiba (JP)

(73) Assignee: Sony Corporation, Tokyo (JP)

( * ) Notice: Subject to any disclaimer, the term of this patent is extended or adjusted under 35 U.S.C. 154(b) by 1762 days.

(21) Appl. No.: 11/677,974

(22) Filed: Feb. 22, 2007

(65) Prior Publication Data

US 2007/0147207 A1 Jun. 28, 2007

Related U.S. Application Data

(63) Continuation of application No. 10/169,422, filed as application No. PCT/JP01/09573 on Oct. 31, 2001, now Pat. No. 7,215,610.

(30) Foreign Application Priority Data

Oct. 31, 2000 (JP) ................. 2000-331739
Nov. 2, 2000 (JP) ................. 2000-335406

(51) Int. Cl.
*H01L 29/06* (2006.01)
*G06F 21/16* (2013.01)
*G11B 20/00* (2006.01)
(52) U.S. Cl.
CPC .......... *G06F 21/16* (2013.01); *G11B 20/00884* (2013.01)
USPC ................. 726/31; 726/32; 726/33

(58) Field of Classification Search
CPC .............. G06F 21/16; G11B 20/00884; G11B 20/00731; G11B 20/00173
USPC ................................................. 726/31, 32, 33
See application file for complete search history.

(56) References Cited

U.S. PATENT DOCUMENTS

| 5,231,546 | A  | * | 7/1993  | Shimada ........................ 360/60  |
| 5,568,550 | A  | * | 10/1996 | Ur ................................. 382/306 |
| 5,963,909 | A  | * | 10/1999 | Warren et al. .................... 705/52 |
| 6,434,538 | B1 | * | 8/2002  | Ibaraki et al. ................... 705/57 |
| 6,449,109 | B1 | * | 9/2002  | Hirata ............................. 360/15 |
| 6,529,506 | B1 |   | 3/2003  | Yamamoto et al.             |
| 6,571,220 | B1 | * | 5/2003  | Ogino et al. ..................... 705/51 |
| 7,409,073 | B2 | * | 8/2008  | Moskowitz et al. .......... 382/100 |
| 2001/0042043 | A1 | * | 11/2001 | Shear et al. ..................... 705/51 |
| 2004/0131183 | A1 |   | 7/2004  | Sako                         |

FOREIGN PATENT DOCUMENTS

| EP | 0942418 | 9/1999 |
| EP | 0994621 | 4/2000 |
| EP | 1001625 | 5/2000 |
| JP | 6-202864 | 7/1994 |

(Continued)

*Primary Examiner* — David Garcia Cervetti
(74) *Attorney, Agent, or Firm* — Oblon, Spivak, McClelland, Maier & Neustadt, L.L.P.

(57) ABSTRACT

According to the type of each of a plurality of external input interfaces, it is decided whether digital watermark information is to be detected from data entered via the external input interface. Digital watermark information is not detected from data entered via the external input interface and from which it has been decided not to detect any digital watermark information, but the data is recorded. Thus, there can be provided a data recording apparatus which is not applied with a any heavy load owing to the omission of any unnecessary detection of digital watermark information.

10 Claims, 23 Drawing Sheets

(56) References Cited

FOREIGN PATENT DOCUMENTS

| | | |
|---|---|---|
| JP | 7-29291 | 1/1995 |
| JP | 7-67047 | 3/1995 |
| JP | 7-245740 | 9/1995 |
| JP | 7-288762 | 10/1995 |
| JP | 7-288798 | 10/1995 |
| JP | 9-140900 | 6/1997 |
| JP | 9-311917 | 12/1997 |
| JP | 10 112883 | 4/1998 |
| JP | 11-155125 | 6/1999 |
| JP | 11-225183 | 8/1999 |
| JP | 11-296976 | 10/1999 |
| JP | 11-338985 | 12/1999 |
| JP | 11-355267 | 12/1999 |
| JP | 2000-59323 | 2/2000 |
| JP | 2000-82258 | 3/2000 |
| JP | 2000-99728 | 4/2000 |
| JP | 2000-123480 | 4/2000 |
| JP | 2000-149421 | 5/2000 |
| JP | 2000-152196 | 5/2000 |
| JP | 2000-163871 | 6/2000 |
| JP | 2000-195162 | 7/2000 |
| JP | 2000-201269 | 7/2000 |
| JP | 2000-244726 | 9/2000 |
| JP | 2000-251395 | 9/2000 |
| JP | 2000-268497 | 9/2000 |
| JP | 2002-140082 | 5/2002 |
| WO | WO 97/33283 | 9/1997 |
| WO | WO 98/02881 | 1/1998 |
| WO | WO 98/16928 | 4/1998 |

* cited by examiner

APPARATUS FOR, AND METHOD OF, RECORDING/PLAYING AUDIO DATA HAVING ADDITIONAL INFORMATION EMBEDDED THEREIN

CROSS-REFERENCE TO RELATED APPLICATION

This application is a Continuation of and is based upon and claims the benefit of priority under 35 U.S.C. §120 for U.S. Ser. No. 10/169,422, filed Nov. 19, 2002, the entire contents of which are incorporated herein by reference. This application also claims the benefit of priority under 35 U.S.C. §119 from Japanese Patent No. 2000-0335406, filed Nov. 2, 2000, and Japanese Patent No. 2000-0331739, filed Oct. 31, 2000.

TECHNICAL FIELD

The present invention generally relates to the field of audio data recording and playing, and more particularly to a data recording apparatus, data playing apparatus, data recording/playing apparatus, data recording method and a data playing method, for recording/playing audio data or the like having additional information such as copyright management information embedded therein, and a storage medium having such audio data recorded therein.

BACKGROUND ART

Digital data such as audio data recorded in a rapidly accessible storage medium such as a CD (compact disc) can be copied rapidly and easily, and such copied data is almost equivalent in quality to the original data. Thus, it has been strongly demanded to take effective measures against illegal copying in order to protect the copyright of digital data, and various techniques against illegal copying have ever been proposed.

To protect the copyrights of audio content and video content, there have been proposed digital watermarking techniques by which copyright management information used for copying control, playing control, tracing history of copying or the like is embedded into main data such as audio data or video data in a form which will not influence the main data.

As a typical example of such digital watermarking techniques, SDMI (Secure Digital Music Initiative) is well known. For example, in case digital watermark information is embedded in audio data by the SDMI technique and the audio data is reproduced by a player supporting the SDMI technique, the player has to detect the digital watermark information for selection of an audio content (including also recording control and playing control).

For example, a data recording apparatus having an interface complying with the 1394 serial bus standard of the IEEE (Institute of Electrical and Electronics Engineers, Inc.) (will be referred to as "IEEE 1394 interface" hereunder) is constructed as shown in FIG. 1. It should be noted that in this case, the digital watermark information is embedded in audio PCM data.

As shown in FIG. 1, the data recording apparatus is supplied at an input terminal 1 thereof with compressed audio data from a data playing apparatus having the IEEE 1394 interface. In the data playing apparatus, the compressed audio data is subjected to output-limiting as shown in FIG. 2 before outputting to the data recording apparatus. That is, the compressed audio data is outputted from the data playing apparatus via the IEEE 1394 interface to the data recording apparatus. For outputting the compressed audio data, for example SCMS (serial copy management system) information is used to limit the outputting via the IEEE 1394 interface, which will be described in detail below with reference to FIG. 2.

First in step S1, a system controller 10 included in the data recording apparatus communicates with an output destination via an IEEE 1394 interface 2 also included in the data recording apparatus and judges whether the output destination supports the IEEE 1394 interface 2 (will be referred to as "compliant device" hereunder). When the result of judgment is that the output destination is not any compliant device, the system controller 10 goes to step S5 where the compressed audio data will be encrypted for outputting with an encrypt key for decryption of the encrypted data not sent to the output destination. Thus, the noncompliant device is inhibited from decrypting the encrypted data. It should be noted that in step S5, neither the encrypted data nor the encrypt key is passed to the output destination which is not any compliant device, as another way of disabling the device from decrypting the encrypted data.

When it is judged in step S1 that the output destination is a compliant device, the system controller 10 goes to step S2 where it will judge whether the output destination as a compliant device is a recorder or not. When the output destination is no any recorder, the system controller 10 jumps to step S4 where the compressed audio data will be encrypted for outputting and the encrypt key for decryption of the encrypted audio data will also be sent to the output destination.

When it is judged in step S2 that the output destination is a compliant device, the system controller 10 goes to step S3 where it will interpret the SCMS information to judge whether the information means "copy allowed for one generation". When the result of interpretation of the SCMS information is that the recording is inhibited, the system controller 10 goes to step S5 where the compressed audio data will be encrypted for outputting but the encrypt key for decryption of the encrypted data will not be sent to the output destination.

When the result of interpretation of the SCMS information in step S3 is that the recording is allowed, the system controller 10 goes to step S4 where the compressed audio data will be encrypted for outputting and the encrypt key for decryption of the encrypted data will also be sent to the output destination. That is, the compressed audio data will be transferred to the compliant recorder via the IEEE 1394 interface 2.

As above, since the outputting via the IEEE 1394 interface 2 is limited, the data recording apparatus being the data-transfer destination is enabled to decrypt and record the encrypted data only when the SCMS information means that copying is allowed, but the data recording apparatus cannot decrypt the compressed audio data and record the data normally when the SCMS information means that the recording is inhibited.

Data processed and sent as above is supplied to the data recording apparatus in FIG. 1 via the input terminal 1 and to a decryption circuit 3 via the IEEE 1394 interface 2. When the recording is allowed, the encrypt key is also sent along with the encrypted data. The data recording apparatus acquires the encrypt key via the IEEE 1394 interface 2 and causes the decryption circuit 3 to decrypt the encrypted data with the encrypt key.

The compressed audio data decrypted in the decryption circuit 3 is supplied to a decompression circuit 4 in order to detect digital watermark information (indicated with a reference "WM" in the illustration) embedded in audio PCM (pulse code modulated) data, and the compressed data is decompressed or expanded for decoding. The expansion-decoded audio data is supplied to a recording control circuit 5.

Audio PCM data from the decompression circuit 4 is also supplied to a digital watermark information detection circuit 6 which will extract copyright-protective additional data having been embedded in the audio PCM data by the digital watermarking. Similar to the SCMS information, the additional data indicates "one copy allowed", "copy inhibited", "copy-free" or the like, for example.

The system controller 10 includes a microcomputer for example, and interprets digital watermark information from the digital watermark information detection circuit 6. When the digital watermark information means that copy is inhibited, the system controller 10 controls the recording control circuit 5 to inhibit the recording. That is, the system controller 10 inhibits the audio PCM data from being supplied to the circuits downstream of the recording control circuit 5, for example.

When the digital watermark information is interpreted to is "one copy allowed" or "copy-free", the system controller 10 allows the recording by controlling the recording control circuit 5 to supply the audio PCM data to the downstream circuits. The audio data from the recording control circuit 5 is supplied to a digital watermark information rewrite circuit 7. Then, when the digital watermark information is interpreted to be "one copy allowed", the system controller 10 controls the digital watermark information rewrite circuit 7 to rewrite the digital watermark information from "one copy allowed" to "copy inhibited".

The audio PCM data from the digital watermark information rewrite circuit 7 is supplied to a compression circuit 8 where it will be compressed again and supplied to an encryption circuit 9 where it will be encrypted. Further, the encrypted data from the encryption circuit 9 is supplied to a recording modulation circuit 11 where it will be subject to predetermined modulation for modulation (will be referred to as "recording modulation" hereunder). Then, the output from the recording modulation circuit 11 is supplied to a write head 12 which will record the data to a recordable optical disc 13. The optical disc 13 is rotated by a spindle motor 14 driven at a predetermined velocity under the control of a servo circuit 15. It should be noted that the system controller 10 has connected thereto a key-control unit 16 having keys which are operated by the user for entry of a command and data, and an LCD (liquid crystal display) unit 17 as a display element to provide the user with necessary display information.

As above, in the data recording apparatus illustrated in FIG. 1, audio data can securely be transmitted via the IEEE 1394 interface 2 and the recording is controlled according to digital watermark information to positively protect the copyright of the audio data. It should be noted that it has recently been proposed to digital watermark information to limit the data reproduction in the data playing apparatus.

It should be reminded here that it has so far been proposed to embed digital watermark information in main data by spectrum spreading, embed digital watermark information around a high-energy portion of main data, or embed digital watermark information in main data under the effect of masking. In any of these techniques, however, the detection and rewrite of digital watermark information will cause the recorder and player to be heavily loaded, resulting in a degradation in performance of the apparatuses. In recording of a compressed content whose copyright is securely protected as having been described above with reference to FIGS. 1 and 2, it is necessary to decrypt encrypted data and decompress or expand compressed data to restore PCM data for subjection to detection of digital watermark information. For recording the data, it is necessary to encrypt and compress the data again, which causes the performance of the apparatuses to be degraded. Also, such extra operations will disadvantageously add to the power consumption. Further, it takes more time in many cases to detect digital watermark information, and the time from a user's operation of a recording or playing start key until an actual start of recording or playing is longer, which will cause the user to feel something strange.

DISCLOSURE OF THE INVENTION

Accordingly, the present invention has an object to overcome the above-mentioned drawbacks of the prior art by providing a data recording apparatus, data playing apparatus, data recording/playing apparatus, data recording method, data playing method, and a storage medium, capable of minimizing performance degradation and power consumption of the apparatuses.

The above object can be attained by providing a data recording apparatus including detecting means for detecting additional information embedded in input data, recording means for recording the input data to a storage medium, and recording controlling means for controlling the recording means according to the additional information detected by the detecting means. In the above apparatus, additional information embedded in more secure input data than the input data is not detected by the detecting means.

Also, the above object can be attained by providing a data playing apparatus including detecting means for detecting additional information embedded in input data, reproducing means for reproducing the input data, and controlling means for controlling the reproducing means according to the additional information detected by the detecting means. In the above apparatus, additional information embedded in more secure input data than the input data is not detected by the detecting means.

Also, the above object can be attained by providing a data recording apparatus including a plurality of external interface means, additional information detecting means provided correspondingly to the type of each of the external input interface for detecting additional information embedded in input data supplied via the external input interface means, recording means for recording the input data to a storage medium, and recording controlling means for controlling the recording means according to the additional information detected by the additional information detecting means.

Also, the above object can be attained by providing a data playing apparatus including a plurality of external interface means, additional information detecting means provided correspondingly to the type of each of the external input interface for detecting additional information embedded in input data supplied via the external input interface means, reproducing means for reproducing the input data, and controlling means for controlling the reproducing means according to the additional information detected by the additional information detecting means.

Also, the above object can be attained by providing a data recording apparatus including judging means for judging whether input data has been encrypted detecting means for detecting additional information embedded in the input data according to the result of judgment from the judging means, recording means for recording the input data to a storage medium, and recording controlling means for controlling the recording means according to the additional information detected by the detecting means.

Also, the above object can be attained by providing a data playing apparatus including judging means for judging whether input data has been encrypted, detecting means for detecting additional information embedded in the input data according to the result of judgment from the judging means, reproducing means for reproducing the input data, and controlling means for controlling the reproducing means according to the additional information detected by the detecting means.

Also, the above object can be attained by providing a data recording/playing apparatus including reading means for reading data from a first storage medium, discriminating means for discriminating the format of the data read by the reading means, additional information detecting means for detecting additional information embedded in the data read by the reading means according to the result of discrimination from the discriminating means, recording means for recording the read data to a second storage medium, and recording controlling means for controlling the recording means according to the additional information detected by the additional information detecting means.

Also, the above object can be attained by providing a data recording/playing apparatus including reading means for reading data from a first storage medium, discriminating means for discriminating the type of the first storage medium, additional information detecting means for detecting additional information embedded in the data read by the reading means according to the result of discrimination from the discriminating means, recording means for recording the read data to a second storage medium; and recording controlling means for controlling the recording means according to the additional information detected by the additional information detecting means.

Also, the above object can be attained by providing a data recording method including steps of detecting additional information embedded in input data, recording the input data to a storage medium, and controlling the recording according to the detected additional information. In the above method, additional information embedded in more secure input data than the input data is not detected.

Also, the above object can be attained by providing a data playing method including steps of detecting additional information embedded in input data, reproducing the input data, and controlling the reproducing means according to the additional information detected by the detecting means. In the above method, additional information embedded in more secure input data than the input data is not detected.

Also, the above object can be attained by providing a data recording method including steps of detecting additional information by additional information detecting means provided correspondingly to the type of each of a plurality of external input interfaces for detecting additional information embedded in input data supplied via the external input interface means, and recording the input data to a storage medium according to the additional information detected by the additional information detecting means.

Also, the above object can be attained by providing a data playing method including steps of detecting additional information by additional information detecting means provided correspondingly to the type of each of the external input interface for detecting additional information embedded in input data supplied via the external input interface means, and reproducing the input data according to the additional information detected by the additional information detecting means.

Also, the above object can be attained by providing a data recording method including steps of judging whether input data has been encrypted, detecting additional information embedded in the input data according to the result of judgment, and recording the input data to a storage medium according to the detected additional information.

Also, the above object can be attained by providing a data playing method including steps of judging whether input data has been encrypted, detecting additional information embedded in the input data according to the result of judgment, and reproducing the input data according to the detected additional information.

Also, the above object can be attained by providing a data recording/playing method including steps of reading data from a first storage medium, discriminating the format of the read data, detecting additional information embedded in the read data according to the result of discrimination, and recording the read data to a second storage medium according to the defected additional information.

Also, the above object can be attained by providing a data recording/playing method including steps of reading data from a first storage medium, discriminating the type of the first storage medium, detecting additional information embedded in the read data according to the result of discrimination, and recording the read data to a second storage medium according to the detected additional information.

Also, the above object can be attained by providing a storage medium having recorded therein a processing program including steps of detecting additional information embedded in input data, recording the input data to a storage medium, and controlling the recording according to the detected additional information, wherein additional information embedded in more secure input data than the input data is not detected.

Also, the above object can be attained by providing a storage medium having recorded therein a processing program including steps of detecting additional information embedded in input data, reproducing the input data, and controlling the reproduction according to the additional information detected by the detecting means, wherein additional information embedded in more secure input data than the input data is not detected.

Also, the above object can be attained by providing a storage medium having recorded therein a processing program including steps of detecting additional information by additional information detecting means provided correspondingly to the type of each of a plurality of external input interfaces for detecting additional information embedded in input data supplied via the external input interface means, and recording the input data to a storage medium according to the additional information detected by the additional information detecting means.

Also, the above object can be attained by providing a storage medium having recorded therein a processing program including steps of detecting additional information by additional information detecting means provided correspondingly to the type of each of the external input interface for detecting additional information embedded in input data supplied via the external input interface means, and reproducing the input data according to the additional information detected by the additional information detecting means.

Also, the above object can be attained by providing a storage medium having recorded therein a processing program including steps of judging whether input data has been encrypted, detecting additional information embedded in the input data according to the result of judgment, and recording the input data to a storage medium according to the detected additional information.

Also, the above object can be attained by providing a storage medium having recorded therein a processing program including steps of judging whether input data has been encrypted, detecting additional information embedded in the input data according to the result of judgment, and reproducing the input data according to the detected additional information.

Also, the above object can be attained by providing a storage medium having recorded therein a processing program including steps of reading data from a first storage medium, discriminating the format of the read data, detecting additional information embedded in the read data according to the result of discrimination and recording the read data to a second storage medium according to the detected additional information.

Also, the above object can be attained by providing a storage medium having recorded therein a processing program including steps of reading data from a first storage medium, discriminating the type of the first storage medium, detecting additional information embedded in the read data according to the result of discrimination, and recording the read data to a second storage medium according to the detected additional information.

BEST MODE FOR CARRYING OUT THE INVENTION

Figure 1:
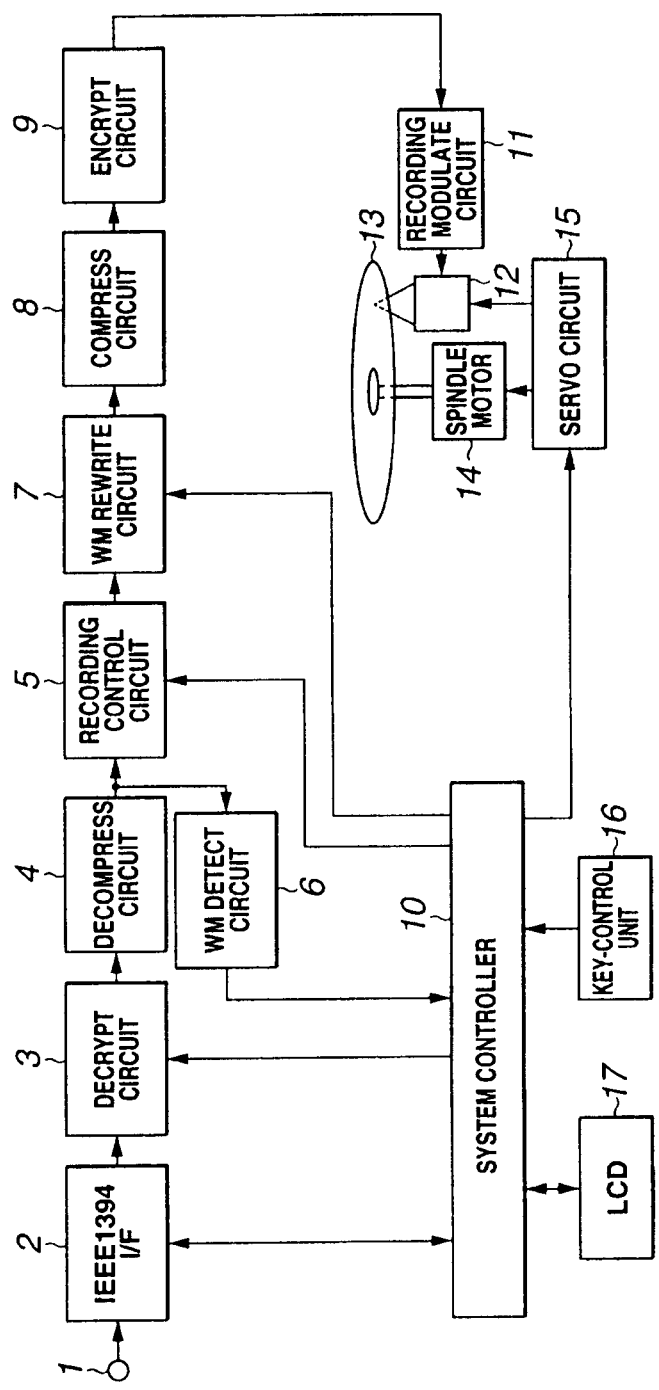
FIG. 1 is a block diagram of a conventional data recording apparatus.
Figure 2:
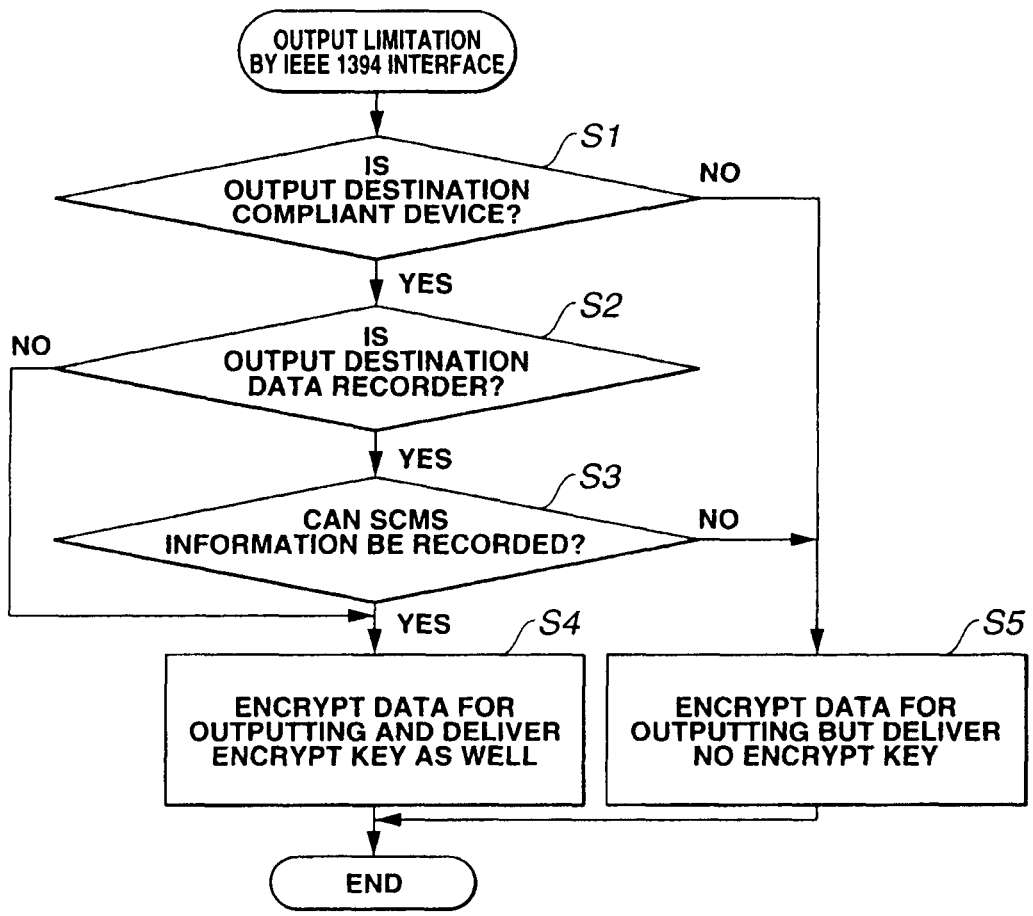
FIG. 2 is a flow chart showing operations made for data output control in an apparatus connected to the data recording apparatus shown in FIG. 1.

Referring to the drawings, several embodiments of a data recording apparatus, data playing apparatus, data recording/playing apparatus, data recording method, data playing method, and a storage medium according to the present invention will be explained. Note that in the embodiments which will be described herebelow, data to be recorded or reproduced is audio data and additional information is copyright management information including recording control information and playing control information such as copy-generation limitation information, embedded in the audio data by the digital watermark.

Note also that in the embodiments going to be described herebelow, whether digital watermark information is to be detected is decided in either of the following two situations:
(1) Control of data recording or playing with digital watermark information is not essentially required since input data is a secure one.
(2) Input data is a one having embedded therein digital watermark information difficult to detect.

In the following, first the data recording apparatus, data playing apparatus and data recording/playing apparatus for the situation (1) will be described, and then the data recording apparatus and data playing apparatus for the situation (2) will be described.

[In case it is decided whether digital watermark information is to be detected or not, based on whether input data is a secure one or an insecure one (for the situation (1))]

[Data Recording Apparatus]

Figure 3:
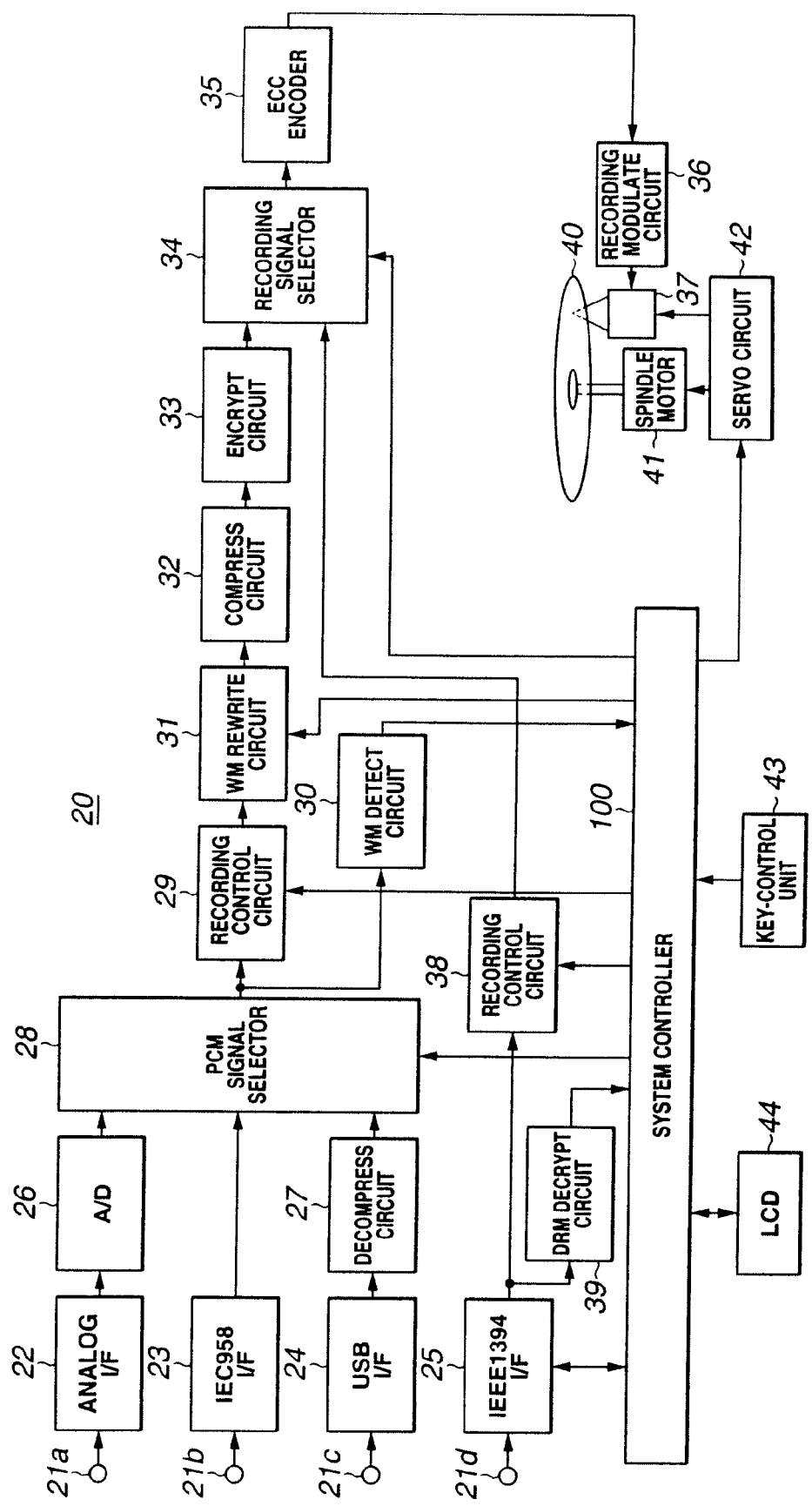
FIG. 3 is a block diagram of an embodiment of the data recording apparatus according to the present invention.

Referring now to FIG. 3, an embodiment of the data recording apparatus according to the present invention is schematically illustrated in the form of a block diagram. The data recording apparatus is generally indicated with a reference 20. It should be noted that the storage medium used in this embodiment is a CD-R (compact disc-recordable), CD-RW (compact disc-rewritable) or an optical disc capable of recording with a density double that of the CD-R or CD-RW and that digital watermark information is embedded in audio data being in the state of PCM signal. Digital watermark information is embedded in audio data by inserting it at lower bits of the PCM signal, embeding it under the masking effect, embeding it around a high-energy part of audio data, or embeding it by the spectrum spreading, for example.

As shown in FIG. 3, the data recording apparatus 20 is provided with a plurality of external input interfaces including an analog input interface 22, EEC (International Electrotechnical Commission) 958 interface 23, USB (universal serial bus) interface 24, and an IEEE 1394 interface 25. In this embodiment, it is judged whether these four external input interfaces 22 to 25 are secure or not. Since the IEEE 1394 interface 25 is secure as having previously been described, there are provided two signal routes such that data entered via this IEEE 1394 interface 25 is not subjected to detection of digital watermark information while data entered via the other three external input interfaces is subjected to such detection.

The analog input interface 22 receives analog audio signal via an analog input terminal 21a formed from a connector jack. The analog audio signal is supplied to an A/D converter 26 which converts the data to audio PCM signal. The audio PCM signal is supplied to a PCM signal selector 28. The IEC 958 interface 23 receives audio PCM signal via a so-called optical digital input terminal 21b, and supplies it to the PCM signal selector 28. The USB interface 24 receives compressed audio signal via an input terminal 21c formed from a connector jack, and supplies it to a decompression circuit 27 in which the data is decompressed or expanded to audio PCM signal. The audio PCM signal is supplied to the PCM signal selector 28. Also, the IEEE 1394 interface 25 receives encrypted compressed audio data via an input terminal 21d formed from a connector jack. As will be described in detail later, the data entered via the IEEE 1394 interface 25 is recorded to an optical disc via another route without being supplied to the PCM signal selector 28. The user selects one of the data entered via these external input interfaces for recording to the optical disc. For this selection, the data recording apparatus 20 is provided with a key-control unit 43 having provided thereon a plurality of keys such as recording start and stop keys in addition to the input select key. A key-operation signal produced by the user operating a corresponding key is supplied to the system controller 100.

The system controller 100 includes for example a microcomputer, and interprets the key-operation signal supplied from the key-control unit 43 to judge which key has been operated, and controls correspondingly to the result of judgment. Then, when it is judged that the key having been operated by the user is the input selection key and any external input interface other than the IEEE 1394 interface 25 has been selected, the system controller 100 controls the PCM signal selector 28 to select and output the signal from the selected external input interface while controlling a recording signal selector 34, which will be described in detail later, to select a route for a signal from the PCM signal selector 28. Also, when the it is judged that the key having been operated by the user is the input select key and the IEEE 1394 interface 25 has been selected, the system controller 100 controls the recording signal selector 34 to select a route for a signal from the IEEE 1394 interface 25. It should be noted that the data recording apparatus 20 is provided with an LCD unit 44 for example in this embodiment (the LCD unit 44 is connected to the system controller 100), as a display device to inform the user of which key has been operated and display information having to be given to any other use.

The audio PCM signal output from the PCM signal selector 28 is supplied to a recording control circuit 29 and also to a digital watermark information detection circuit 30. The digital watermark information detection circuit 30 detects digital watermark information, if any, embedded in the audio PCM signal from the PCM signal selector 28, and supplies the result of detection as copyright management information to the system controller 100.

The system controller 100 interprets the copyright management information. When the copyright management information is interpreted to mean that the copy is inhibited like "copy inhibited", the system controller 100 controls the recording control circuit 29 to inhibit the recording. That is, the system controller 100 controls the recording control circuit 29 to stop supply of the audio PCM data to the circuits downstream of the recording control circuit 29. Also, when the copyright management information is interpreted to mean that the recording for copying is possible like "one copy allowed" or "copy-free", the system controller 100 allows the recording for copying by controlling the recording control circuit 29 to output the audio PCM signal to the circuits downstream of the circuit 29. The audio data from the recording control circuit 29 is supplied to the digital watermark information rewrite circuit 31. Even if the copy control information included in the copyright management information allows the recording for copying, the system controller 100 controls the digital watermark information rewrite circuit 31 to rewrite the digital watermark information from "one copy allowed" to "copy inhibited" or to a one to reduce the number of times copying can be done, if the copy control information is a one to limit the copy generation or number of copies like "one copy allowed". When it is not necessary to rewrite the digital watermark information, the digital watermark information rewrite circuit 31 is bypassed or passed through.

To compress and encrypt audio data for recording in this embodiment, the audio PCM data from the digital watermark information rewrite circuit 31 is first supplied to a compression circuit 32 where it will be compressed, the compressed data is then supplied to an encryption circuit 33 where the data will be encrypted. Then the encrypted data is supplied to an ECC encoder 35 via the recording signal selector 34. In the ECC encoder 35, the input data is subject to error-correction coding using CIRC (cross interleave Reed-Solomon code) for example. Then the ECC encoder 35 supplies the error-correction coded data to a recording modulation circuit 36.

The recording modulation circuit 36 makes a recording modulation based on the EFM (eight-to-fourteen modulation) technique.

The recording modulation circuit 36 supplies the modulated data to a write head 37 via a recording amplifier (not shown). The write head 37 writes the data to an optical disc 40. The optical disc 40 is rotated by a spindle motor 41 at a predetermined velocity under the LCV (linear constant velocity) control of a servo circuit 42. The servo circuit 42 produces a velocity servo signal based on audio PCM signal to be recorded, for example, and supplies it to the spindle motor 41. The servo circuit 42 receives a control signal from the system controller 100 to control the position of the write head 37 radially of the optical disc 40. Also the servo circuit 42 also controls the position of the write head 37 in the tracking direction. In case the optical disc 40 is a CD-R, the write head 37 records data by changing the refractive index of the recording layer of the optical disc 40. Also, when the optical disc 40 is a CD-RW, the write head 37 records data by changing the crystalline/amorphous state of the optical disc 40.

In this embodiment, audio data entered via the IEEE 1394 interface 25 is not subjected to detection of any digital watermark information but it is controlled according to DRM (digital rights management) information incidental to the audio data. The DRM information can be used to easily separate copyright management information such as SCMS information or the like from even a data having been encrypted and compressed. Thus, in this embodiment, data entered via the IEEE 1394 interface 25 is supplied to the recording control circuit 38 and also to a DRM information decryption circuit 39. The DRM information decryption circuit 39 decrypts DRM information, if any, incidental to data entered via the IEEE 1394 interface 25, and supplies the result of interpretation to the system controller 100.

When the recording for copying is to be inhibited according the result of DRM information interpretation, the system controller 100 inhibits the recording by controlling the recording control circuit 38 to stop supply of the audio PCM data to the circuits downstream of the circuit 38. When the recording for copying is to be allowed according to the result of DRM information interpretation, the system controller 100 allows the recording for copying by controlling the recording control circuit 38 to supply the audio PCM signal to the circuits downstream of the circuit 38. Thus the audio data from the recording control circuit 38 is supplied to the recording signal selector 34. That is, data entered via the IEEE 1394 interface 25 can be recorded for copying as it is in a form it takes when entered since it has already been encrypted and compressed.

Figure 4:
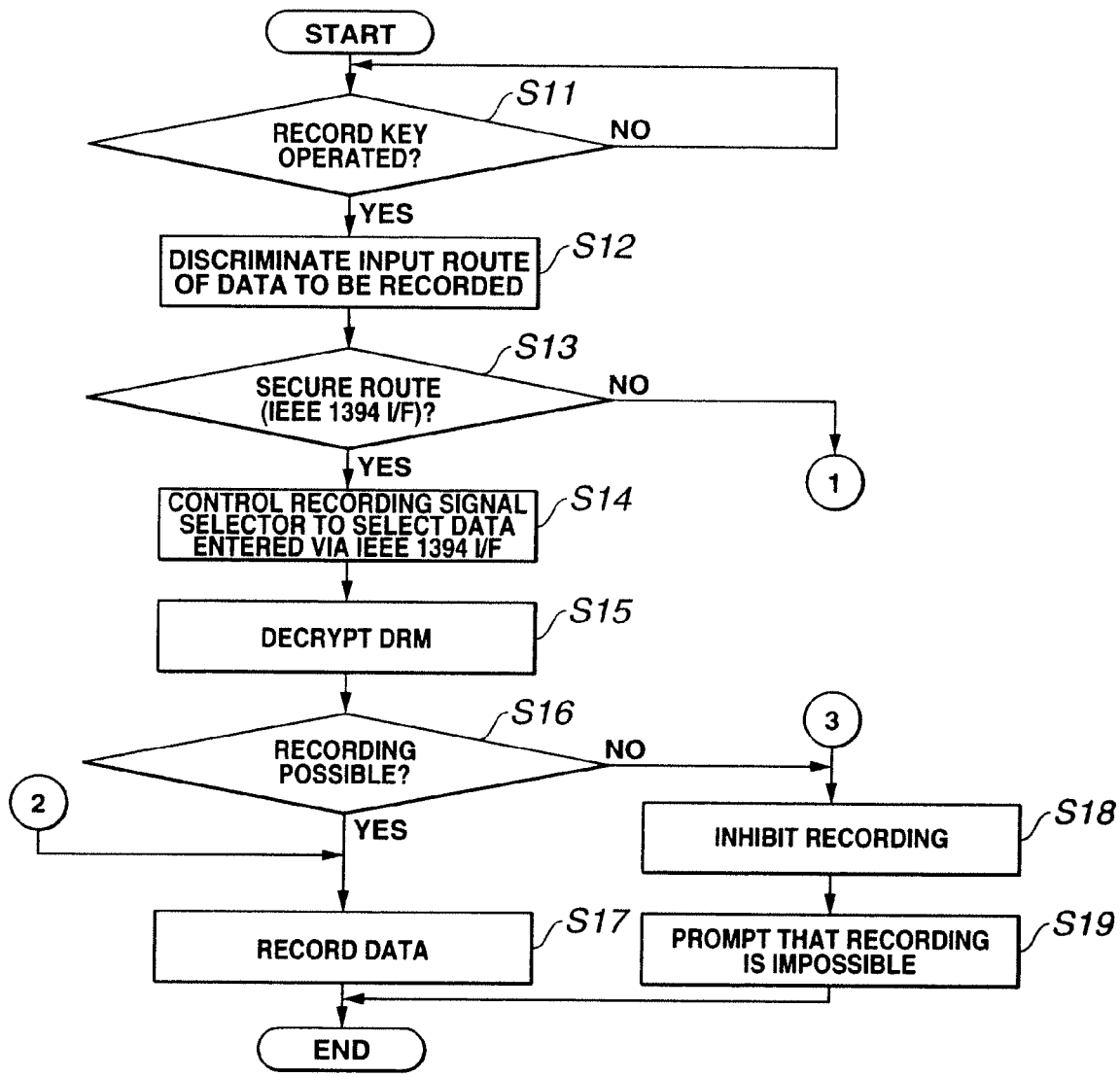
FIG. 4 is a flow chart showing operations made for data recording in the data recording apparatus shown in FIG. 3.
Figure 5:
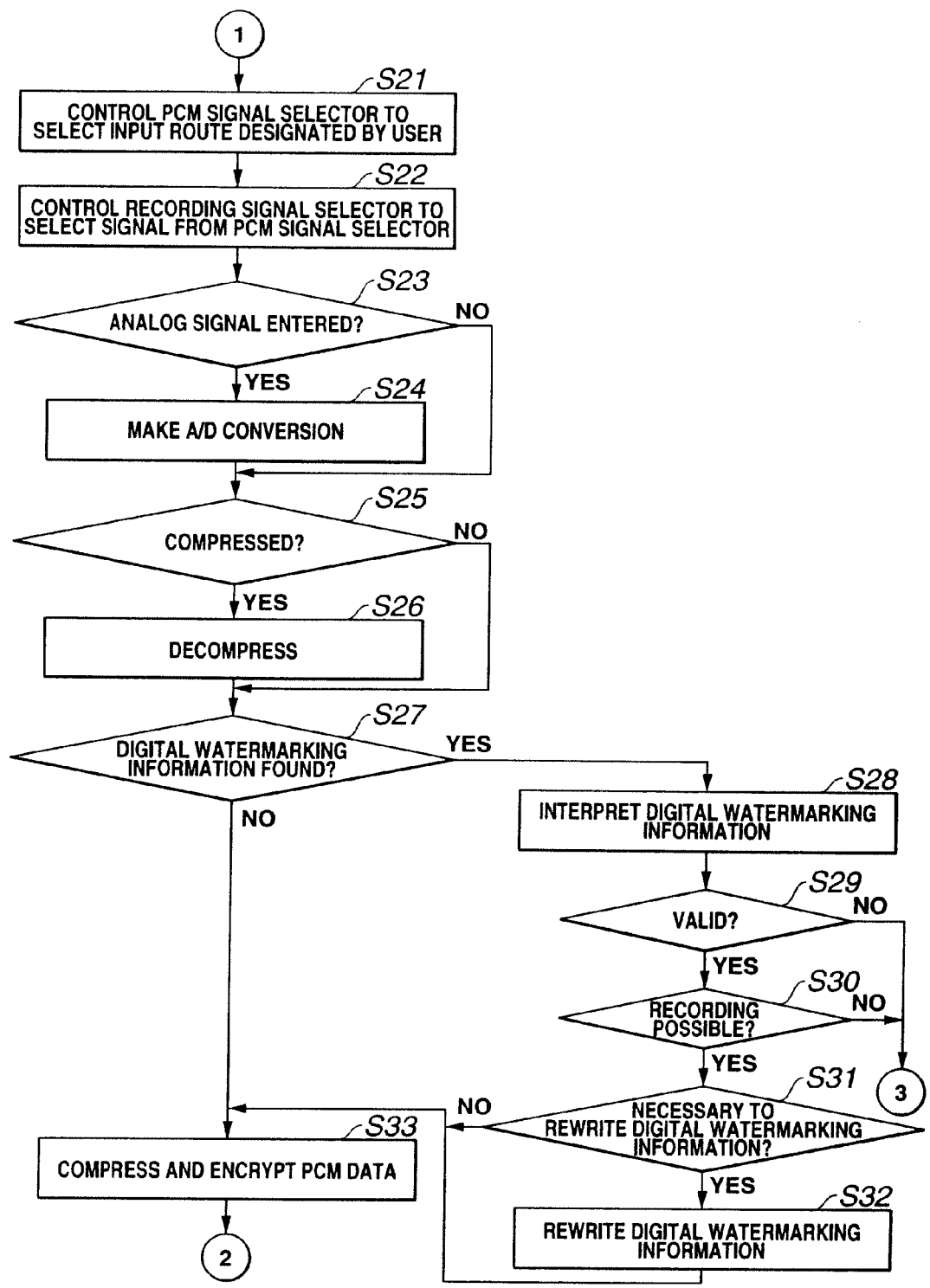
FIG. 5 is a flow chart showing operations made for data recording in the data recording apparatus shown in FIG. 3.

Next, operations made for data recording in the data recording apparatus 20 constructed as above will be described with reference to the flow charts in FIGS. 4 and 5. It should be noted that these flow charts show the operations made mainly under the control of the system controller 100.

First in step S11, the system controller 100 judges whether the record key on the key-control unit 43 has been operated by the user. When the result of judgment is that the record key has been pressed, the system controller 100 goes to step S12 where it will judge, based on the operated input select key on the key-control unit 43, which one of the external input interfaces is selected for an input route for data to be recorded. Then in step S13, the system controller 100 judges whether the discriminated input route is secure (IEEE 1394 interface 25 in this embodiment).

When the result of judgment is that the IEEE 1394 interface 25 has been selected, the system controller 100 goes to step S14 where it will control the recording signal selector 34 to select data entered via the IEEE 1394 interface 25, that is, output from the recording control circuit 38. Then in step S15, the system controller 100 interprets the result of decryption of the DRM information from the DRM information decryption circuit 39, and in step S16, the system controller 100 judges whether the copying is possible. When it is judged in step S16 that the copying is possible, the system controller 100 goes to step S17 where it will control the recording control circuit 38 to the aforementioned recording-allowed state such that data is supplied from the recording signal selector 34 to the write head 37 via the ECC encoder 35 and recording modulation circuit 36 for recording to the optical disc 40.

On the other hand, if it is judged in step S16 that the recording for copying is impossible as the result of DRM information interpretation means, the system controller 100 goes to step S18 where it will control the recording control circuit 38 to inhibit the recording as above, and goes to step S19 where it will cause the LCD unit 44 to prompt the user, by display, that the recording is impossible.

Also, when it is judged in step S13 that other than the IEEE 1394 interface 25 has been selected, the system controller 100 goes to step S21 where it will control the PCM signal selector 28 to select an input route having been designated by the user operating the key-control unit 43, and then goes to step S22 where it will control the recording signal selector 34 to select a signal from the PCM signal selector 28, or output from the encryption circuit 33.

Then in step S23, the system controller 100 judges whether the analog input interface 22 has been selected as the input route. When the result of judgement is "yes", the system controller 100 goes to step S24 where input analog data will be converted by an A/D converter 26 to digital signal. Then the system controller 100 goes to step S25 where it will judge whether the USB interface 24 has been selected as the input route and thus the data has been compressed. When the result of judgment is "yes", the system controller 100 goes to step S26 where it will control the decompression circuit 27 to decompress or expand the compressed data. When the result of judgment in step S25 is that the data has not been compressed, namely, that the IEC 958 interface 23 has been selected, the system controller 100 skips to step S26 where it will cause the decompression circuit 27 to decompress the compressed data.

Next in step S27, the system controller 100 judges whether digital watermark information is embedded in the audio PCM data to be recorded. For this purpose, the system controller 100 causes the digital watermark information detection circuit 30 to detect digital watermark information in the data from the PCM signal selector 28 for a predetermined length of time in order to see whether digital watermark information can thus be detected or not within the predetermined length of time. When digital watermark information can have been detected in the data, the system controller 100 goes to step S28 where it will interpret the digital watermark information and then goes to step S29 where it will judge whether the detected digital watermark information is valid or not. This judgment is intended to see whether the digital watermark information has been falsified to have contents which cannot normally be.

When it is judged in step S29 that the detected digital watermark information is valid, the system controller 100 goes to step S30 where it will interpret the digital watermark information, namely, copyright management information, and judges, according to the result of interpretation, whether the recording for copying of the data is possible.

When the result of judgment in step S29 is that the detected digital watermark information is not valid or when it is judged in step S30 that the recording for copying is impossible, the system controller 100 goes to step S18 where it will inhibit the data copying, and then goes to step S19 where it will cause the LCD unit 44 to prompt the user, by display, that the recording is impossible.

Also, when the result of judgment in step S30 is that the recording for copying (will also be referred to as "copying-recording" hereunder wherever appropriate) is possible, the system controller 100 goes to step S31 where it will judge wether the digital watermark information has to be rewritten. When it is judged in step S31 that the digital watermark information should be rewritten for a copying-recording control such as limitation of copy generation or of number of copies, the system controller 100 goes to step S32 where it will cause the digital watermark information rewrite circuit 31 to rewrite the digital watermark information.

After having rewritten the digital watermark information or when it is judged that the digital watermark information has not to be rewritten, the system controller 100 goes to step S33 where the PCM data will be compressed and encrypted, and then goes to step S17 where the data will be recorded as having previously been described.

Note that in this embodiment, when it is judged in step S27 that the digital watermark information cannot be detected, the system controller 100 goes to step S33 and subsequent steps to record the PCM data. This is intended because there exists a conventional content having no digital watermark information embedded therein or a content unknown as to how it has been protected against copying. However, since such a content not known as to how it has been protected against copying is also unclear as to how it has been routed, it may be inhibited from being recorded.

As having been described in the foregoing, since the data recording apparatus is designed not to detect any digital watermark information when the input route is secure, it can record data entered via a secure route for copying very simply and with a highly improved performance. That is, with the conventional data recorded shown in FIG. 1, even a data entered via a secure route has to be decrypted and decompressed for the purpose of detecting digital watermark information, if any, embedded in the data and has to be compressed and encrypted again for recording. In comparison with the above conventional data recording apparatus, however, the embodiment of the data recording apparatus according to the present invention, having been described with reference to FIG. 3, needs no circuits for such data decompression, decryption, compression and encryption.

A data recording apparatus having only a secure external input interface such as the IEEE 1394 interface will need no digital watermark information detection circuit and recording control circuit.

Note that the secure interface is not limited to the IEEE 1394 interface 25 but any external input interface with SAC (secure authenticated channel), such as a secure USB interface, will do. Also, it is not any essential requirement for the secure interface that data has been encrypted, but an interface via which authentication can be made with a counterpart apparatus, for example, and which can transmit data without having to encrypt the data, may be regarded as a secure interface.

[Data Playing Apparatus for the Situation (1)]
[Data Playing Apparatus]

Figure 6:
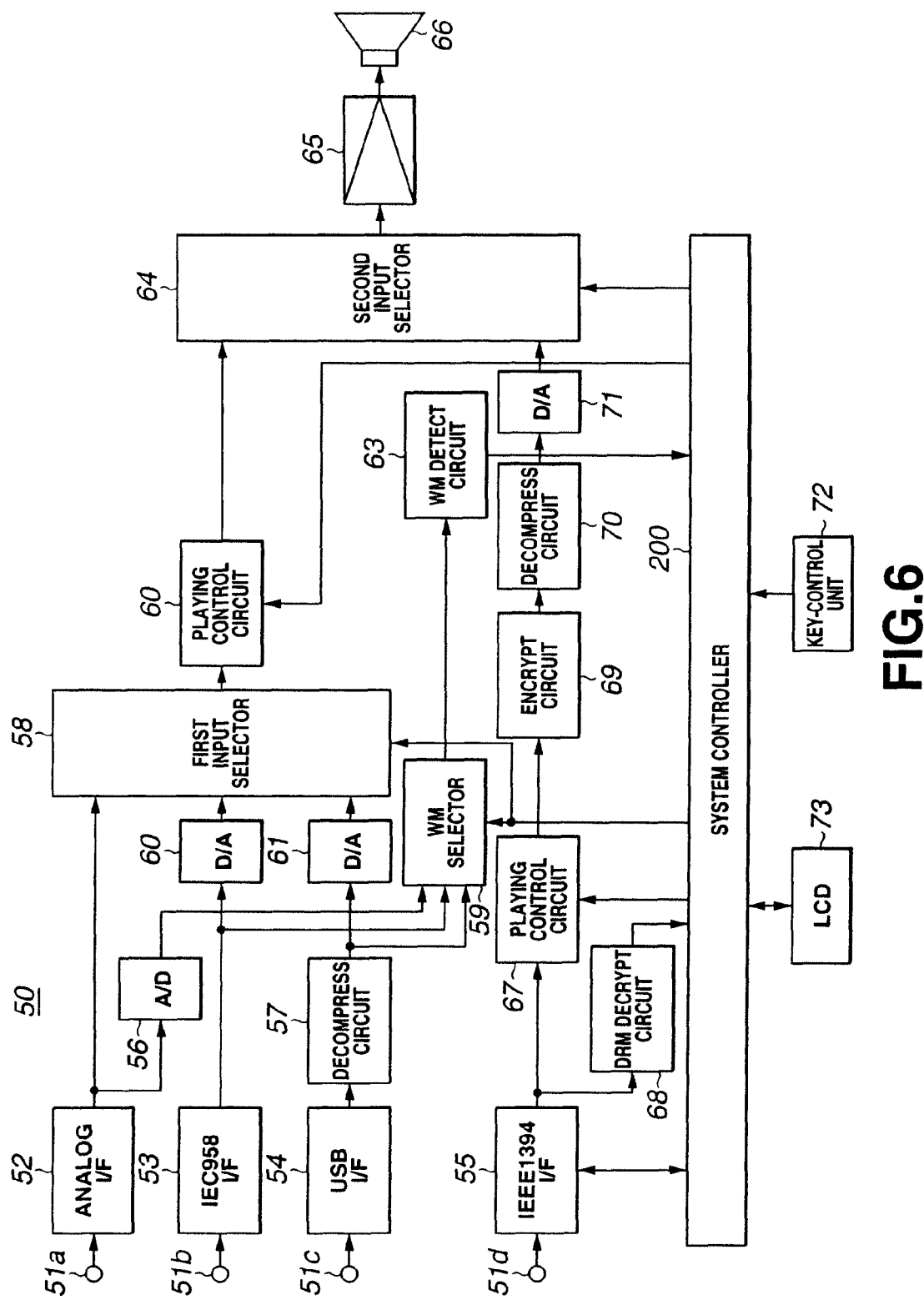
FIG. 6 is a block diagram of an embodiment of the data playing apparatus according to the present invention.

Referring now to FIG. 6, an embodiment of the data playing apparatus according to the present invention is schematically illustrated in the form of a block diagram. The data playing apparatus is generally indicated with a reference 50. Also in this embodiment, digital watermark information is embedded in audio data being a PCM signal by inserting it at lower bits of the PCM signal, embeding it under the masking effect, embedding it around a high-energy part of audio data, or embedding it by the spectrum spreading, for example, as having previously been described.

As shown in FIG. 6, the data playing apparatus 50 is provided with a plurality of external input interfaces including an analog input interface 52, IEC (International Electrotechnical Commission) 958 interface 53, USB (universal serial bus) interface 54, and an IEEE 1394 interface 55. In this embodiment, it is judged whether these four external input interfaces 52 to 55 are secure or not. Since the IEEE 1394 interface 55 is secure, there are provided two signal routes such that data entered via this IEEE 1394 interface 55 is not subjected to detection of digital watermark information while data entered via the other three external input interfaces is subjected to such detection.

The analog input interface 52 receives analog audio signal via an analog input terminal 51a formed from a connector jack, and supplies it to a first input selector 58 and also to an A/D converter 56 which will convert the data to audio PCM signal and supply it to a digital watermark information selector 59. The IEC 958 interface 53 receives audio PCM signal entered via a so-called optical digital input terminal 51b, and supplies it to a D/A converter 60 and also to the digital watermark information selector 59. The D/A converter 60 converts the input data to analog data and supplies it to the first input selector 58. The USB interface 54 receives compressed audio signal via an input terminal 51c formed from a connector jack, and supplies it to a decompression circuit 57 in which the data is decompressed or expanded to audio PCM signal. The audio PCM signal is supplied to a D/A converter 61 and also to the digital watermark information selector 59. The D/A converter 61 converts the input data to analog data and supplies it to the first input selector 58. Also, the IEEE 1394 interface 55 receives encrypted compressed audio data via an input terminal 51d formed from a connector jack. The data entered via the IEEE 1394 interface 55 is reproduced via another route without being supplied to the first input selector 58 and digital watermark information selector 59.

The user selects one of the data entered via these external input interfaces for reproduction. For this selection, the data playing apparatus 50 includes a key-control unit 72 having provided thereon a plurality of keys such as playing start and stop keys in addition to the input select key, and supplies a key-operation signal produced by the user operating a corresponding key to the system controller 200.

The system controller 200 includes for example a microcomputer, and interprets the key-operation signal supplied from the key-control unit 72 to judge which of the keys has been operated, and controls correspondingly to the result of judgment. Then, when it is judged that the key having been operated by the user is the input selection key and any external input interface other than the IEEE 1394 interface 55 has been selected, the system controller 200 controls the first input selector 58 to select and output the signal from the selected external input interface while controlling the digital watermark information selector 59 to select the similarly selected external input interface. Further the system controller 200 controls a second input selector 64, which will be described in detail later, to select a route for a signal from the first input selector 58. Also, when the it is judged that the key having been operated by the user is the input select key and the IEEE 1394 interface 55 has been selected, the system controller 200 controls the second input selector 64 to select a route for a signal from the IEEE 1394 interface 55. It should be noted that the data playing apparatus 50 is provided with an LCD unit 73 for example in this embodiment (the LCD unit 73 is connected to the system controller 200), as a display device to inform the user of which key has been operated and display information having to be given to any other use.

The audio PCM signal output from the first input selector 58 is supplied to a playing control circuit 62, and data output from the digital watermark information selector 59 is supplied to a digital watermark information detection circuit 63. The digital watermark information detection circuit 63 detects digital watermark information, if any, embedded in the audio PCM signal from the digital watermark information selector 59, and supplies the result of detection as copyright management information to the system controller 200. The system controller 200 interprets the copyright management information. When the copyright management information is interpreted to mean "play inhibited", the system controller 200 controls the playing control circuit 62 to inhibit the playing. That is, the system controller 200 controls the playing control circuit 62 to stop supply of the audio PCM data to the circuits downstream of the playing control circuit 62.

Also, when the copyright management information is interpreted to mean that the playing is possible, the system controller 200 allows data playing by controlling the playing control circuit 62 to output the audio PCM signal to the circuits downstream of the circuit 62. The audio data from the playing control circuit 62 is supplied to the second input selector 64.

In this embodiment, audio data entered via the IEEE 1394 interface 55 is not subjected to detection of any digital watermark information but it is controlled according to DRM (digital rights management) information incidental to the audio data. Thus, in this embodiment, data entered via the IEEE 1394 interface 55 is supplied to the playing control circuit 67 and also to a DRM information decryption circuit 68. The DRM information decryption circuit 68 decrypts DRM information, if any, incidental to data entered via the IEEE 1394 interface 55, and supplies the result of interpretation to the system controller 200.

When playing is to be inhibited according the result of DRM information interpretation, the system controller 200 inhibits the playing by controlling the playing control circuit 67 to stop supply of the audio PCM data to the circuits downstream of the circuit 67. When the playing is to be allowed according to the result of DRM information interpretation, the system controller 200 allows the playing by controlling the playing control circuit 67 to supply the audio PCM signal to the circuits downstream of the circuit 67.

The audio data from the playing control circuit 67 is decrypted by a decryption circuit 69, and then decompressed by a decompression circuit 70. Then the decompressed audio data is converted by a D/A converter 71 to analog data, and then supplied to the second input selector 64. As having been described above, the second input selector 64 is selected with a selection control signal supplied from the system controller 200 and which corresponds to an input selection made by the user operating the key-control unit 72. Then the second input selector 64 supplies the selected analog audio data to a speaker 66 via an audio amplifier 65, and the speaker 66 reproduces a sound from the audio data.

Figure 7:
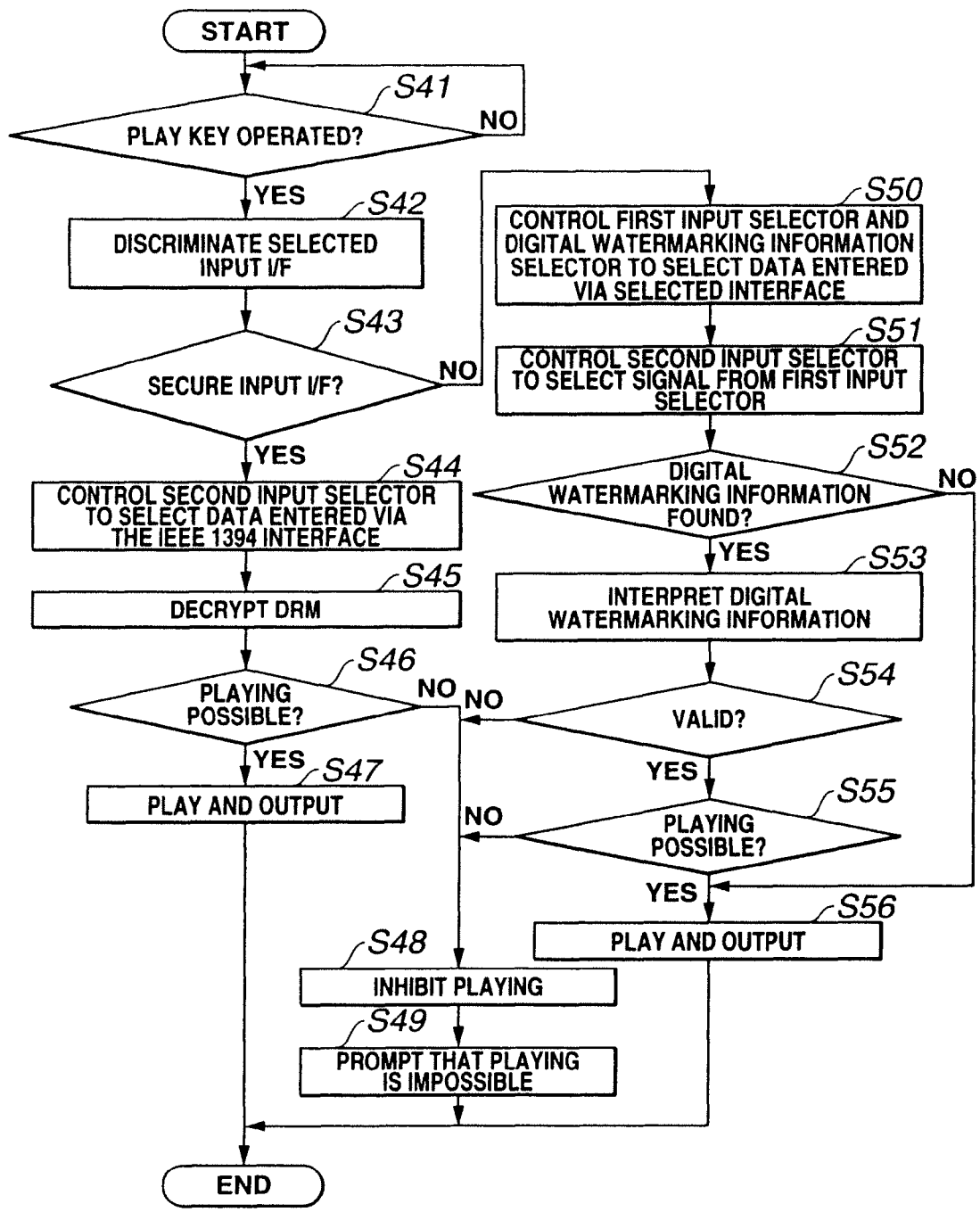
FIG. 7 is a flow chart showing operations made for data reproduction in the data playing apparatus shown in FIG. 6.

Next, operations made for data playing in the data playing apparatus 50 constructed as above will be described with reference to the flow chart in FIG. 7. It should be noted that this flow chart shows the operations made mainly under the control of the system controller 200.

First in step S41, the system controller 200 judges whether the play key on the key-control unit 72 has been operated by the user. When the result of judgment is that the play key has been pressed, the system controller 200 goes to step S42 where it will judge, based on the operated input select key on the key-control unit 72, which one of the external input interfaces is selected for an input route for data to be played. Then in step S43, the system controller 200 judges whether the discriminated input route is secure (IEEE 1394 interface 55 in this embodiment).

When the result of judgment is that the IEEE 1394 interface 55 has been selected, the system controller 200 goes to step S44 where it will control the second input selector 64 to select data entered via the IEEE 1394 interface 55, that is, output from the D/A converter 71. Then in step S45, the system controller 200 interprets the result of interpretation of the DRM information from the DRM information decryption circuit 68, and in step S46, the system controller 200 judges whether the playing is possible. When it is judged in step S46 that the playing is possible, the system controller 200 controls the playing control circuit 67 to the aforementioned playing-allowed state such that data is supplied from the recording signal selector 34 to the write head 37.

Thus, the data entered via the IEEE 1394 interface 55 is decrypted by the decryption circuit 69, decompressed by the decompression circuit 70, converted by the D/A converter 71 to analog data, supplied to the speaker 66 via the second input selector 64 and audio amplifier 65, and thus reproduced as a sound in step S47. Since no digital watermark information detection is made and no playing control based on the result of digital watermark information detection is done at this time, the performance from the operation of the play key until the sound reproduction is very good.

On the other hand, if it is judged in step S46 that the playing is impossible as the result of DRM information interpretation means, the system controller 200 goes to step S48 where it will control the playing control circuit 67 to inhibit the playing as above, and goes to step S49 where it will cause the LCD unit 73 to prompt the user, by display, that the playing is impossible.

Also, when it is judged in step S43 that any external input interface other than the IEEE 1394 interface 55 has been selected, the system controller 200 goes to step S50 where it will control the first input selector 58 and digital watermark information selector 59 to select an input route having been designated by the user operating the key-control unit 72, and then goes to step S51 where it will control the second input selector 64 to select a signal from the first input selector 58, or output from the playing control circuit 62. Then in step S52, the system controller 200 monitors the output from the digital watermark information detection circuit 63 to judge whether digital watermark information is embedded in audio PCM data to be played. For the purpose of this judgment, the system controller 200 causes the digital watermark information detection circuit 63 to detect digital watermark information in the audio PCM data for a predetermined length of time in order to see whether digital watermark information can thus be detected or not within the predetermined length of time. When digital watermark information can have been detected in the data, the system controller 200 goes to step S53 where it will interpret the digital watermark information and then goes to step S54 where it will judge whether the detected digital watermark information is valid or not. This judgment is intended to see whether the digital watermark information has been falsified to have contents which cannot normally be.

When it is judged in step S54 that the detected digital watermark information is valid, the system controller 200 goes to step S55 where it will interpret the digital watermark information, namely, copyright management information, and judges, according to the result of interpretation, whether the playing of the data is possible.

When the result of judgment in step S54 is that the detected digital watermark information is not valid or when it is judged in step S55 that the playing is impossible, the system controller 200 goes to step S48 where it will inhibit the data playing. When it is judged in step S55 that the playing is possible, the system controller 200 goes to step S56 where it will control the playing control circuit 62 to the aforementioned playing-allowed state to play the data.

Note that in this embodiment, when it is judged in step S52 that the digital watermark information cannot be detected, the system controller 200 goes to step S56 and subsequent steps to play the data. This is intended because there exists a conventional content having no digital watermark information embedded therein or a content unknown as to how it has been protected against playing. However, since such a content not known as to how it has been protected against playing is also unclear as to how it has been routed, it may be inhibited from being played.

[Data Playing Apparatus]

In the above embodiments, whether digital watermark information has to be detected or not is decided depending upon whether the external input interface is secure or not. However, whether digital watermark information should be detected or not may be decided depending upon whether a recording/playing medium is secure or not. This embodiment of the data playing apparatus according to the present invention is directed to the latter case.

The Applicant of the present invention has proposed an optical disc (will be referred to as "CDx" hereunder) capable of both data recording with the same density (will be referred to simply as "single density" hereunder) as that of the conventional CD (compact disc) and that with a density double (will be referred to as "double density" hereunder) that of the conventional CD. This data playing apparatus is directed to the conventional CD, CD-R (compact disc-recordable) and CD-RW (compact disc-rewritable) as well as to an optical disc CDx capable of the high density recording (including recordable CDx-R and rewritable CDx-RW).

In this embodiment, the optical disc CDx includes three types: single-density disc, double-density disc and single-/double-density disc (only read-only type in which data is recorded in pits). Each of these three types of discs has ID data recorded in TOC information in the lead-in area thereof.

In this embodiment, audio data compatible with the conventional CD and readable by a CD player is continuously recorded in the single-density recording area of the single-density or single-/double-density disc. Also, compressed and encrypted audio data is recorded in the form of a file in the double-density recording area of the double-density disc or single-/double-density disc.

Each of these types of discs has single-density or double-density ID data as well as ID data as to the recording form recorded in the TOC (table of contents) information and file header. The single-/double-density disc has also encrypt key information recorded therein.

Figure 8:
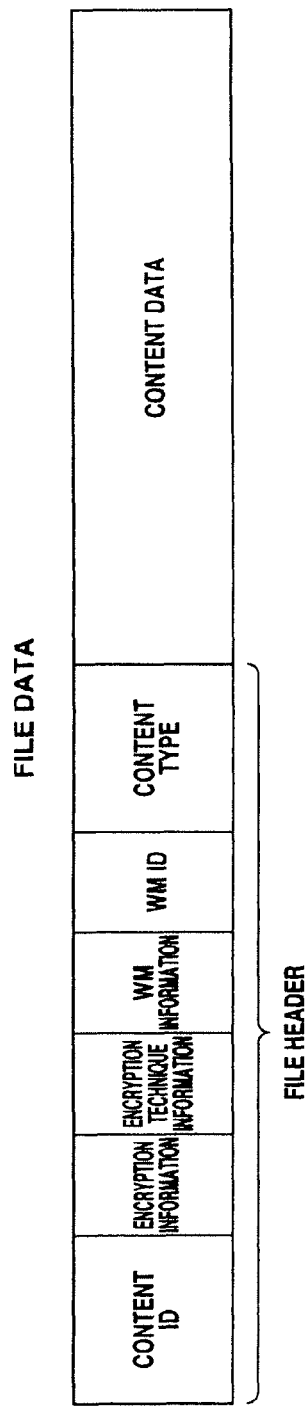
FIG. 8 shows an example of the configuration of a data in the file form in the optical disc used in the present invention.

FIG. 8 shows an example of the configuration of a data in the file form in the optical disc used in the present invention. In this example, a file header added to a content data includes, as shown in FIG. 8, a content ID unique to each content for identification of the content, information indicative of whether the content has been encrypted (encryption information), information indicating how the content has been encrypted (encryption technique information) (in case data has been encrypted), information indicative of whether digital watermark information has been embedded in the content (WM information), information for identification of digital watermarking technique with which the digital watermark information, if any, has been embedded in the content (WMID), and information indicative of the type of the content such as video, audio, text or game program (content type). As having previously been described, similar information to those included in the file header may be included in the TOC information.

Figure 9:
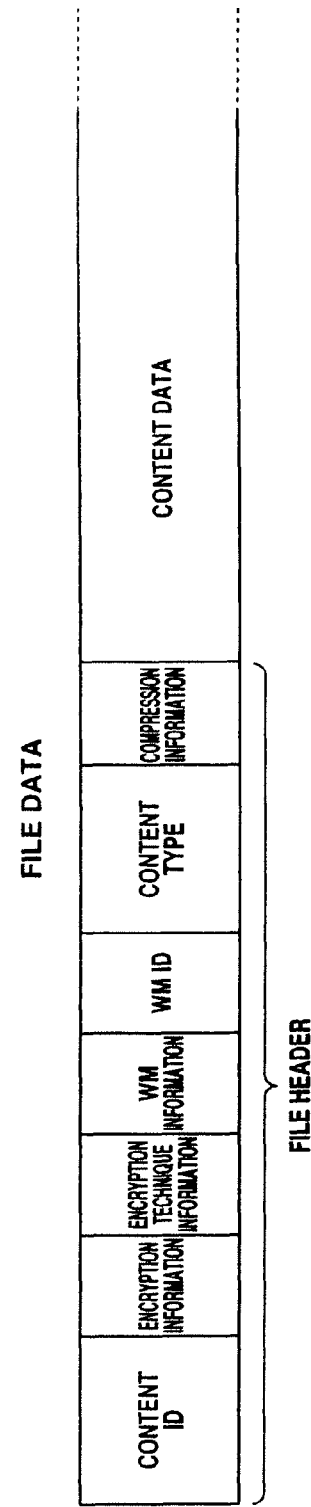
FIG. 9 also shows an example of the configuration of a data in the file form in the optical disc used in the present invention.

FIG. 9 also shows an example of the configuration of a data in the file form in the optical disc used in the present invention. In this example, a file header added to a content data includes, as shown in FIG. 9, signal configuration information such as a content ID unique to each content for identification of the content, information indicative of whether the content has been encrypted (encryption information), information indicative of how the data has been encrypted (encryption technique information), information indicative of whether digital watermark information has been embedded in the content (WM information), information for identification of digital watermarking technique with which the digital watermark information, if any, has been embedded in the content (WMID), information indicative of the type of the content such as video, audio, text or game program (content type), and information indicative of whether the content has been compressed (compression information). As having previously been described, similar information to those included in the file header may be included in the TOC information.

Figure 10:
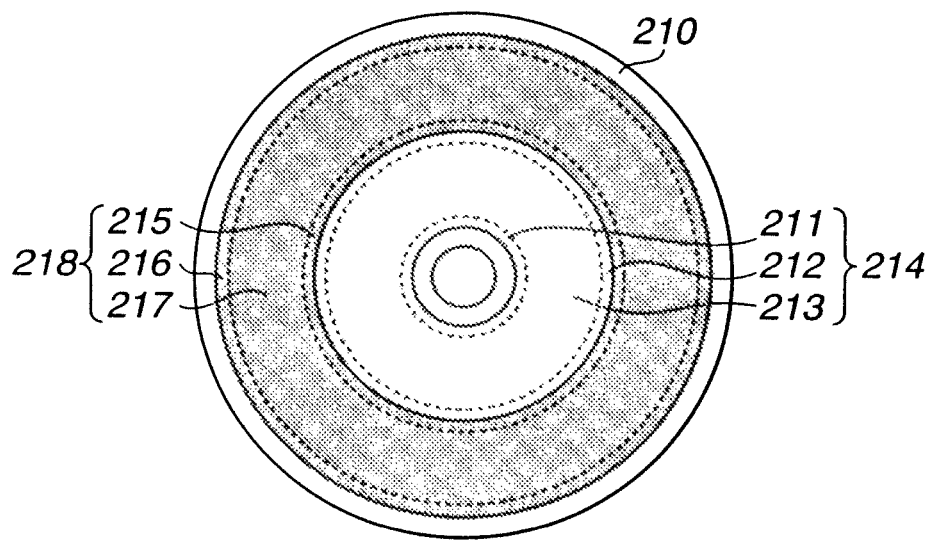
FIG. 10 shows an example of the single- or double-density disc according to the present invention.

FIG. 10 shows, by way of example, the construction of a single- or double-density disc 210 according to the present invention. As will be seen from FIG. 10, the disc 210 has an inner single-density recording area 214 consisting of a data area 213 where error correction-coded and recording-modulated audio PCM data are continuously recorded as in the conventional CD, the data being readable by a conventional popular CD player. The recording area 214 also includes a lead-in area 211 and lead-out area 212. The disc 210 also has an outer double-density recording area 218 where data can be recorded with a higher density than that in the inner single-density recording area 214, namely, with a density double that in the recording area 214 in this embodiment. The outer double-density recording area 218 includes a data area 217 where there are double-density recorded audio PCM data having been compressed, encrypted and configured in sectors by a CD-ROM encoder, and further error correction-coded and recording-modulated. The area 218 also includes a lead-in area 215 where TOC information as to the disc 210 is recorded, and a lead-out area 216.

The optical disc 210 according to this embodiment is made by forming therein pit trains corresponding to data to be recorded by means of a similar system to the authoring system directed to manufacture of a master disc for a CD. However, the optical disc 210 has the double-density recording area 218, which is different from an optical disc made using the conventional authoring system. The information as to the encrypt key for use to decrypt encrypted data recorded in the double-density recording area 218 is recorded by wobbling the pits in the lead-in area 211 or 215 for example. FIGS. 11A, 11B, 11C and 11D explains the recording and playing of the encrypt key information by wobbling the pits.

Figure 11:
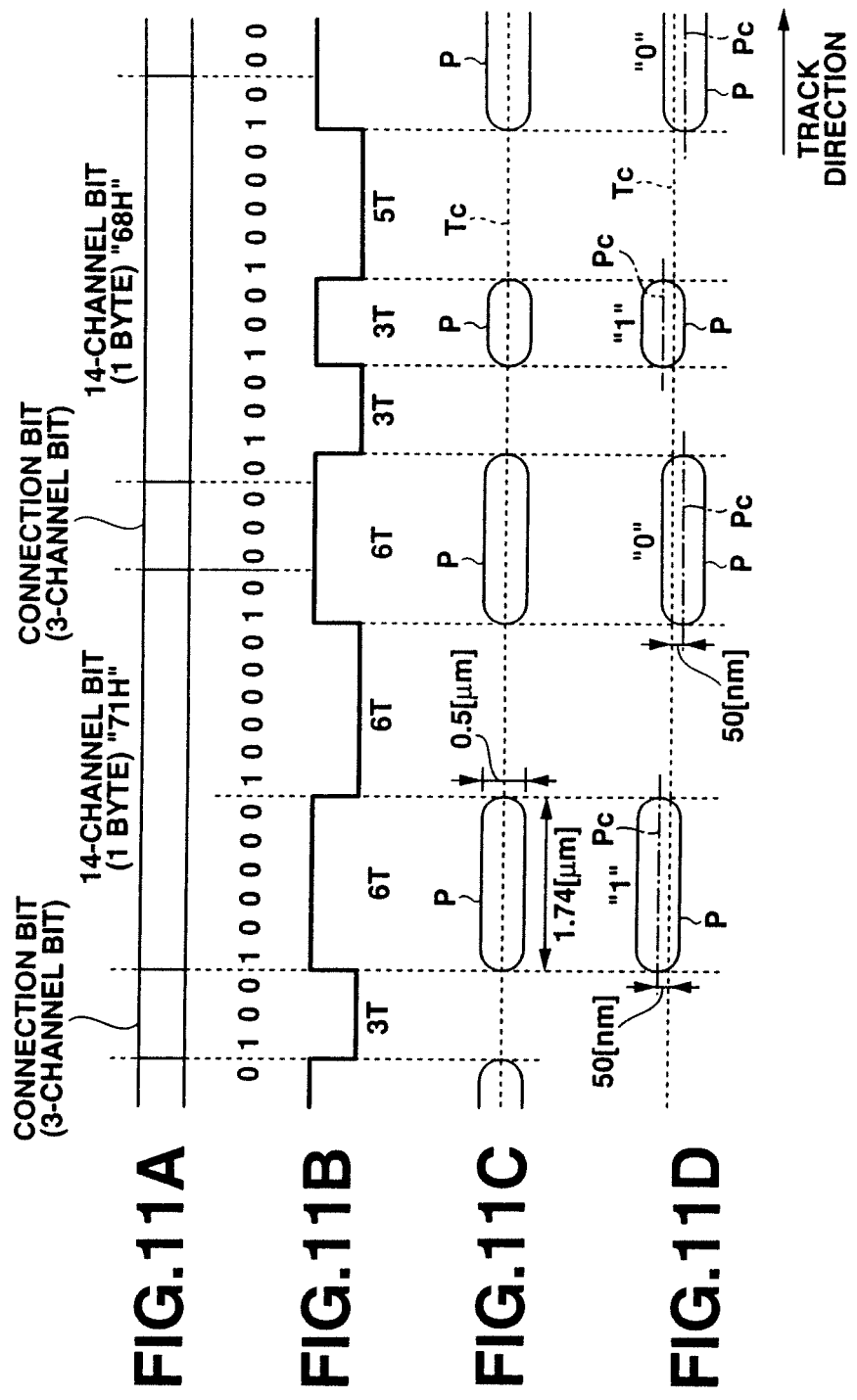
FIGS. 11A, 11B, 11C and 11D explains the data recording and playing operations of the data playing apparatus according to the present invention.

FIG. 11A shows a serial data string being a part of EFM data. The serial data string is subjected to NRZI modulation to produce channel data as shown in FIG. 11B.

In the case of a common compact disc, a train of pits each of 0.5 µm in width is formed, as shown in FIG. 11C, with emission of a laser beam moving linearly turned on and off correspondingly to the channel data shown in FIG. 11B. At this time, the widthwise center Tc of a track (will be referred to as "track center" hereunder) consisting of a plurality of pits and lands between the pits is always aligned with the widthwise center Pc of each bit P as indicated with a dashed line in FIG. 11C.

On the other hand, with the wobble technique, the pits P are formed in positions off the track center Tc in a direction perpendicular to the track direction, that is, in the widthwise direction of the track as shown in FIG. 11D. In the example shown in FIG. 11D, when the additional data is "1", the pits P are formed in positions deflected to the left of the track center Tc in the direction perpendicular to the track direction. When the additional data is "0", the pits P are formed in positions deflected to the right of the track center Tc in the direction perpendicular to the track direction.

At this time, the amount or distance over which the positions of the pits P are deflected should be within the allowable range defined in the CD standards as a deflection of pit forming position during recording of audio data, such that the distance between the widthwise center Pc of the pit (indicated with the dashed line in FIG. 11D) and track center Tc is 50 nm for example.

The track-widthwise deflection of the position of the pit P is detected as a tracking error which is an output of the photodetector in the so-called push-pull system. So, by binarizing the tracking error, the additional data can be reproduced. However, when data is recorded to a recordable CD such as CD-R, CDx-R, CD-RW or CDx-RW, pits can only be formed as shown in FIG. 11C, that is, they cannot be wobbled. Namely, even when data is illegally copied, information as to the encrypt key for decryption of encrypted data cannot be reproduced so that the copyright of the data can appropriately be protected.

Since the optical disc CDx described above has the recorded data encrypted, it can be said to be a secure medium. Especially, the single-/double-density disc has an encrypt key recorded therein by wobbling the pits. So, this type of optical disc is more secure than the CDx-R and CDx-RW. On the other hand, the conventional CD, CD-R, CD-RW, so-called mini disc (MD) and the like can be said to insecure media.

Taking the above in consideration in the data playing apparatus according to the present invention, whether digital watermark information has to be detected or not is decided depending up whether the medium to be played back is a secure one or an insecure one. In this embodiment, when data to be played is an encrypted and compressed one recorded in an optical disc CDx, it is regarded as secure and is not subjected to detection of digital watermark information. In case the data to be played is a one recorded as any other PCM data in the disc, it is judged to be an insecure one and subjected to detection of digital watermark information.

Figure 12:
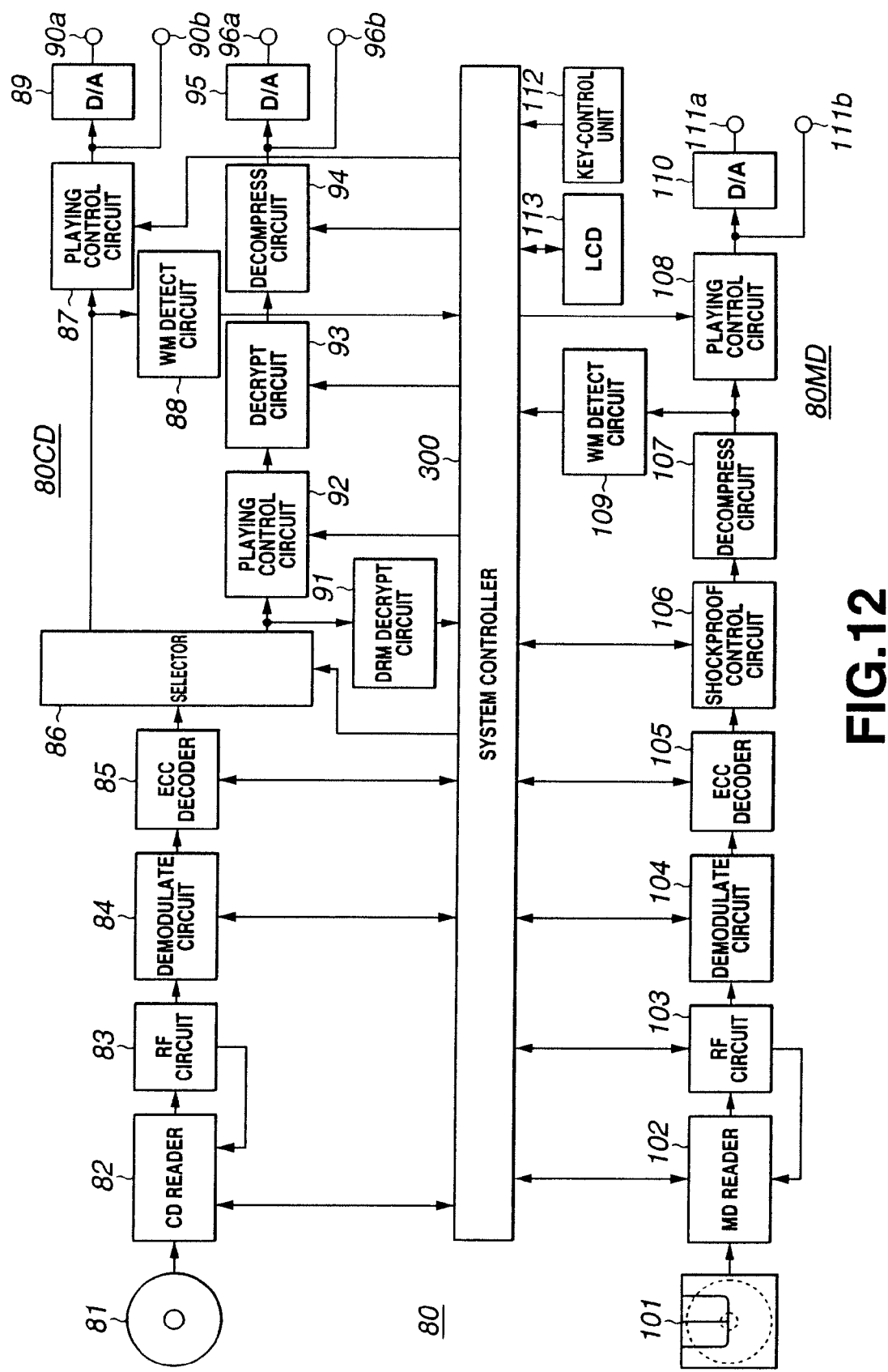
FIG. 12 is a block diagram of another embodiment of the data playing apparatus according to the present invention.
Figure 13:
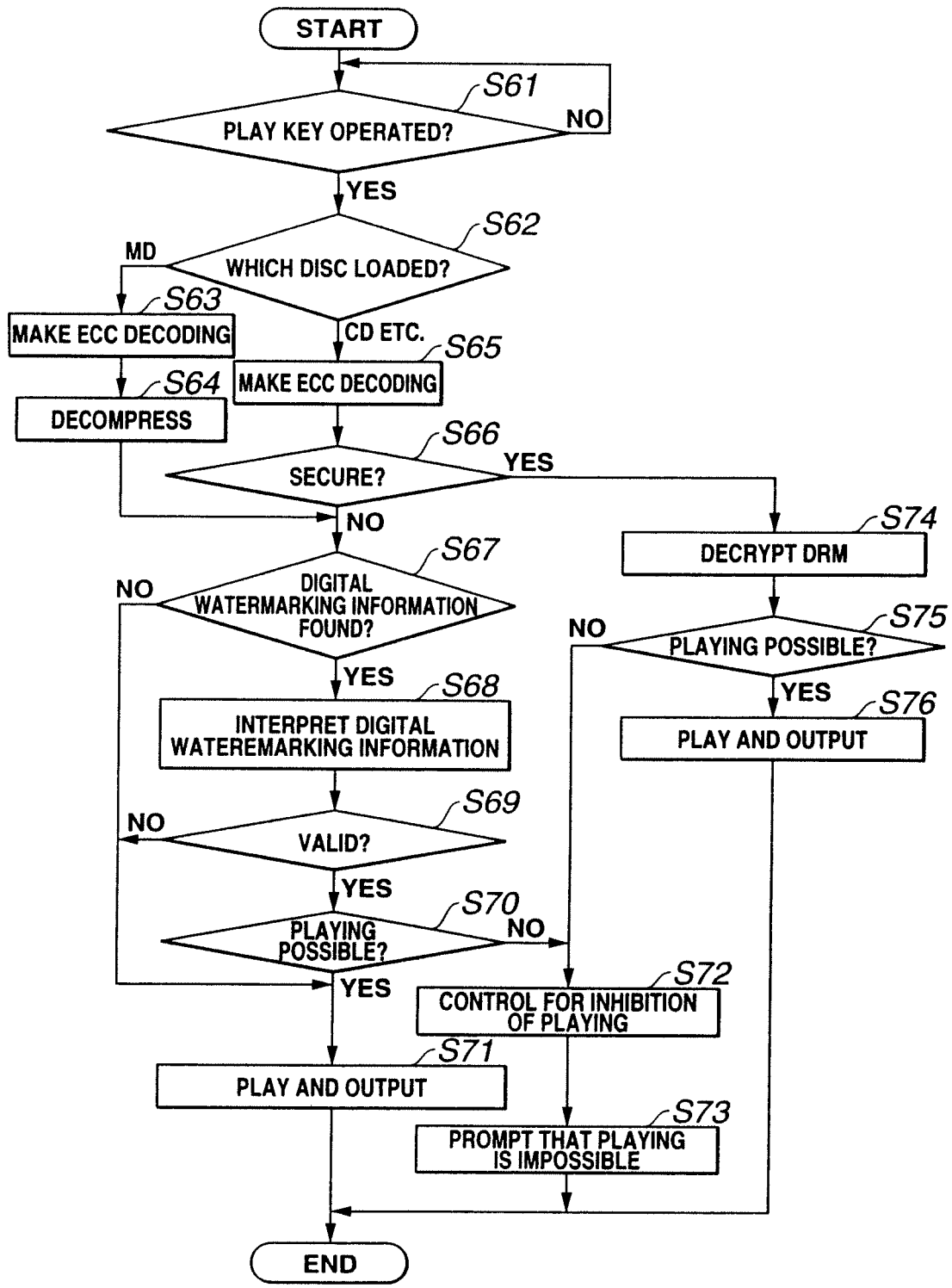
FIG. 13 is a flow chart showing operations made for data reproduction in the data playing apparatus shown in FIG. 12.

FIG. 12 is a block diagram of another embodiment of the data playing apparatus according to the present invention. The data playing apparatus is generally indicated with a reference 80. As shown, this data playing apparatus 80 includes a playing system 80CD for a CD-type disc 81 and a playing system 80MD for an MD-type disc 101.

In the playing system 80CD, when the loaded disc 81 is CDx and has encrypted and compressed data recorded therein, it is played without being subjected to detection of digital watermark information. However, the playing is controlled with the DRM information in this case as well. Also, when the loaded disc 81 is a conventional CD or CD-R, detection of digital watermark information, if any, added to the data from the disc 81 is effected and playing is controlled according to the result of detection to reproduce the data.

On the other hand, in the playing system 80MD, in case data to be reproduced has digital watermark information added thereto, detection of the digital watermark information is effected and playing is controlled according to the result of detection to reproduce the data.

The playing system 80CD includes a reader 82 for the CD-type disc 81 as shown. Data read by an optical pickup (not shown) of the reader 82 is supplied to a demodulation circuit 84 via an RF circuit 83. The data having been modulated for recording is this demodulated. The recording-modulated data is supplied to an ECC decoder 85 where it is error-corrected. Data output from the ECC decoder 85 is supplied to a selector 86.

Also, the TOC information of error-corrected data in the ECC decoder 85 and information in the file header are supplied to a system controller 300. This system controller 300 judges, based on the TOC information and file header information, whether the loaded disc 81 is secure or insecure, and supplies a signal for controlling the selector 86 to the selector 86.

When the loaded disc 81 is judged by the system controller 300 to be an insecure one, the selector 86 supplies its output data to a playing control circuit 87 and also to a digital watermark information detection circuit 88. The digital watermark information detection circuit 88 detects digital watermark information and supplies the result of detection to the system controller 300. The system controller 300 interprets the digital watermark information to judge whether the playing should be allowed or inhibited, and controls the playing control circuit 87 according to the result of judgment.

That is, when the playing is allowed, the playing control circuit 87 outputs data which will be led to a digital output terminal 90b and also to a D/A converter 89 where it will be converted to analog data and led to an analog output terminal 90a. When the playing is inhibited, the control signal from the system controller 300 inhibits the playing control circuit 87 from outputting the data.

Also, when the system controller 300 judges the loaded disc 81 to be secure, the selector 86 supplies output data to a playing control circuit 92 and also to a DRM information decryption circuit 91 where DRM information will be detected in the input data and decrypted and the result of decryption be supplied to the system controller 300. The system controller 300 interprets the DRM information to judge whether the playing should be allowed or inhibited, and controls the playing control circuit 92 according to the result of judgment.

More specifically, when the playing is allowed, the playing control circuit 92 outputs data which will be decrypted by a decryption circuit 93 and then decompressed by a decompression circuit 94. Data output from the decompression circuit 94 is led to a digital output terminal 96b and also to a D/A converter 95 where it will be converted to analog data and led to an analog output terminal 96a. Also, when the playing is inhibited, the control signal supplied from the system controller 300 inhibits the playing control circuit 92 from outputting the data.

Next, the playing system 80MD will be explained. As shown in FIG. 12, the playing system 80MD includes a reader 102 for the MD-type disc 101. Data read by an optical pickup (not shown) of the reader 102 is supplied to a demodulation circuit 104 via an RF circuit 103 and the data having been modulated for recording is demodulated in the demodulation circuit 104. And the demodulated data from the demodulation circuit 104 is supplied to an ECC decoder 105 where it will be error-corrected.

Data output from the ECC decoder 105 is supplied to a shockproof control circuit 106 including a buffer memory (not shown). TOC information of the data having been error-corrected by the ECC decoder 105 is supplied to the system controller 300.

The shockproof control circuit 106 controls write and read to and from the incorporated buffer memory under the control of the system controller 300 so that the data stored in the buffer memory will not be smaller than a predetermined value. Thus, reproduced signals will be kept continuous with each other even when the optical pickup jumps from a track to another track due to a vibration applied to the data playing apparatus.

Data from the shockproof control circuit 106 is supplied to the decompression circuit 107 where audio data compressed with the ATRAC (adaptive transform acoustic coding) technique will be decompressed back to audio PCM data.

The audio PCM data from the decompression circuit 107 is supplied to a playing control circuit 108 and also to a digital watermark information detection circuit 109. The digital watermark information detection circuit 109 will detect digital watermark information and supplies the result of detection to the system controller 300. The system controller 300 interprets the digital watermark information to judge whether the playing should be allowed or inhibited, and controls the playing control circuit 108 according to the result of judgment.

That is, when the playing is allowed, the playing control circuit 108 outputs data which will be led to a digital output terminal 111b and also to a D/A converter 110 where it will be converted to analog data and led to an analog output terminal 111a. When the playing is inhibited, the control signal from the system controller 300 inhibits the playing control circuit 108 from output the data.

Note that the system controller 300 has connected thereto a key-control unit 112 for operation by the user to designate data playing or the like and an LCD unit 113 which displays necessary information thereon.

Next, operations made for data playing in the data playing apparatus 80 constructed as having been described above will be described with reference to the flow chart shown in FIG.

13. It should be noted that these flow chart show the operations made mainly under the control of the system controller 300.

First in step S61, the system controller 300 judges whether the play key on the key-control unit 72 has been operated by the user. When the result of judgment is that the play key has been pressed, the system controller 300 goes to step S62 where it will judge whether the loaded disc is the disc 81 or disc 101. When the result of judgment is that the loaded disc is the disc 101, the system controller 300 activates the playing system 80MD and goes to step S63 where the data will be error-corrected by the ECC decoder 105. In step S64, the system controller 300 controls the decompression circuit 107 to decompress the encrypted data, and in step S67, the system controller 300 judges whether digital watermark information is embedded in the data.

More specifically, the system controller 300 monitors output from the digital watermark information detection circuit 109 to judge, in step S67, whether audio PCM data to be played has digital watermark information embedded therein. For the purpose of this judgment, the system controller 300 causes the digital watermark information detection circuit 109 to detect digital watermark information for more than a predetermined length of time. The system controller 300 judges whether digital watermark information is embedded in the audio PCM data, based on whether the digital watermark information detection circuit 109 can have detected digital watermark information or not.

When digital watermark information can have been detected, the system controller 300 interprets the digital watermark information in step S68, and judges, in step S69, whether the detected digital watermark information is valid. This judgment is intended to see whether the digital watermark information has been falsified to have contents which cannot normally be.

When it is judged in step S69 that the detected digital watermark information is valid, the system controller 300 goes to step S70 where it will interpret the digital watermark information to judge whether the audio PCM data can be played.

When the result of judgment in step S69 is that the detected digital watermark information is not valid or when it is judged in step S70 that the copying is impossible, the system controller 300 goes to step S72 where it will control the playing control circuit 108 to a playing-inhibited state to inhibit the data playing. If the result of judgment in step S70 is that the playing is possible, the system controller 300 goes to step S71 where it will control the playing control circuit 108 to a playing-allowed state to reproduce the data.

Note that in this embodiment, when it is judged in step S67 that the digital watermark information cannot be detected, the system controller 300 goes to step S71 where it will make an arrangement for data playing. This is intended because there exists a conventional content having no digital watermark information embedded therein or a content unknown as to how it has been protected against playing. However, since such a content not known as to how it has been protected against playing is also unclear as to how it has been routed, it may be inhibited from being played.

When it is judged by the system controller 300 in step S62 that the disc loaded is the disc 81, the playing system 80CD is activated and the ECC decoder 105 corrects error in the data in step S65. In step S66, TOC information or file header is read in and interpreted to judge whether the loaded disc 81 is a secure one.

When it is judged that the disc 81 is a CD, CD-R or CD-RW and it is an insecure one, the system controller 300 monitors output from the digital watermark information detection circuit 88 to judge, in step S67, whether audio PCM data to be played has digital watermark information embedded therein. For the purpose of this judgment, the system controller 300 causes the digital watermark information detection circuit 109 to detect digital watermark information for a predetermined length of time. The system controller 300 judges whether digital watermark information is embedded in the audio PCM data, based on whether the digital watermark information detection circuit 109 can have detected digital watermark information or not within the predetermined length of time. When digital watermark information can have been detected, the system controller 300 interprets the digital watermark information in step S68, and judges, in step S69, whether the detected digital watermark information is valid. This judgment is intended to see whether the digital watermark information has been falsified to have contents which cannot normally be.

When it is judged in step S69 that the detected digital watermark information is valid, the system controller 300 goes to step S70 where it will interpret the digital watermark information to judge whether the audio PCM data can be played.

When the result of judgment in step S69 is that the detected digital watermark information is not valid or when it is judged in step S70 that the copying is impossible, the system controller 300 goes to step S72 where it will control the playing control circuit 87 to a playing-inhibited state to inhibit the data playing, and to step S73 where it will cause the LCD unit 113 to prompt the user, by display, that the playing is impossible. If the result of judgment in step S70 is that the playing is possible, the system controller 300 goes to step S71 where it will control the playing control circuit 87 to a playing-allowed state to reproduce the data.

Note that in this embodiment, when it is judged in step S67 that the digital watermark information cannot be detected, the system controller 300 goes to step S71 where it will make an arrangement for data playing. This is intended because there exists a conventional content having no digital watermark information embedded therein or a content unknown as to how it has been protected against playing. However, since such a content not known as to how it has been protected against playing is also unclear as to how it has been routed, it may be inhibited from being played.

When it is judged in step S66 that the loaded disc 81 is secure, detection of digital watermark information is not effected. That is, the system controller 300 interprets, in step S74, the result of decryption of the DRM information from the DRM information decryption circuit 91 to judge, in step S75, whether the playing is possible. When the result of judgment is that the playing is possible, the system controller 300 controls the playing control circuit 92 to the aforementioned playing-allowed state.

Thus, the data from the playing control circuit 92 is decrypted by the decryption circuit 93, decompressed by the decompression circuit 94, outputted via the digital output terminal 96b, converted by the D/A converter 95 to analog data and outputted via the analog output terminal 96a. Since no digital watermark information detection is made and no playing control based on the result of detection is done at this time, the performance from the operation of the play key until the sound reproduction is very good.

On the other hand, when it is judged in step S74 based on the result of DRM information decryption that the playing is impossible, the system controller 300 goes to step S72 where it will control the playing control circuit 92 to the aforementioned playing-inhibited state to inhibit data playing, and goes to step S73 where it will control the LCD unit 113 to prompt the user, by display, that the playing is impossible.

Note that the aforementioned secure medium is just an example and recording media may be classified depending upon whether they are so secure as to make it unnecessary to detect digital watermark information.

[Data Recording/Playing Apparatus]

Figure 14:
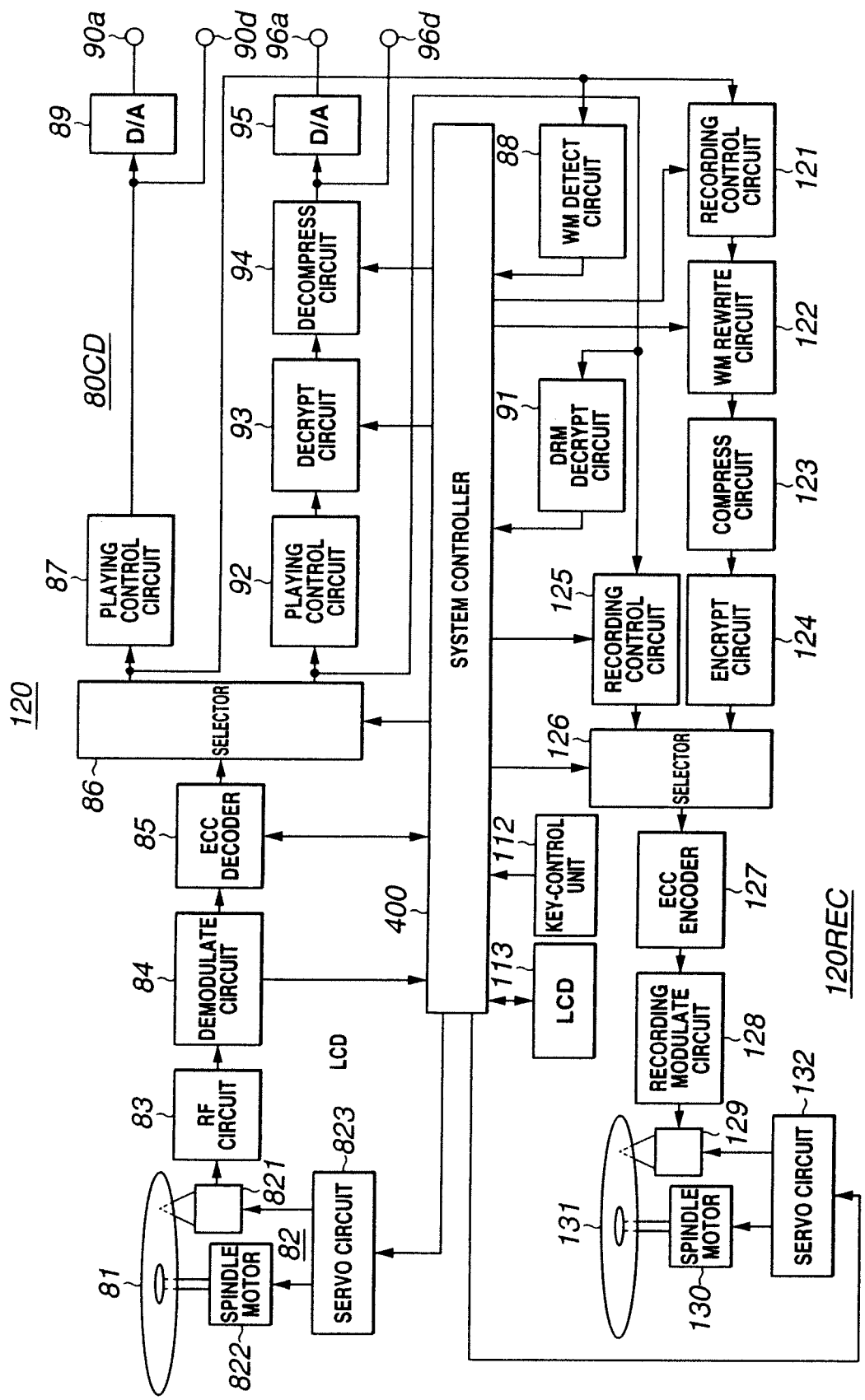
FIG. 14 is a block diagram of a data recording/playing apparatus according to the present invention.

Referring now to FIG. 14, an embodiment of the data recording/playing apparatus according to the present invention is schematically illustrated in the form of a block diagram. The data recording/playing apparatus is generally indicated with a reference 120. The data recording/playing apparatus 120 includes the entire playing system 80CD in the data playing apparatus 80 having been described with reference to FIG. 12, as it is as a playing system. In FIG. 14, however, the reader 82 is illustrated including an optical head 821, spindle motor 822 and a servo circuit 823.

The data recording/playing apparatus 120 includes a system controller 400 instead of the system controller 300 in the data playing apparatus 80, and a recording system 120REC instead of the playing system 80MD in the data layer 80. The data recording/playing apparatus 120 uses CDx-R or CDx-RW as a storage medium, and records compressed and encrypted data to the storage medium. Data played in a secure state is recorded without being subjected to detection of digital watermark information.

As shown in FIG. 14, data outputted from a selector 86 when the medium to be played has been judged by the system controller 400 to be insecure is supplied to a playing control circuit 87 and digital watermark information detection circuit 88, and also to a recording control circuit 121. The recording control circuit 121 is controlled by the system controller 400 according to digital watermark information detected by the digital watermark information detection circuit 88.

The data having passed through the recording control circuit 121 is supplied to a digital watermark information rewrite circuit 122. The digital watermark information rewrite circuit 122 is controlled by the system controller 400 to rewrite digital watermark information embedded in audio PCM data whenever necessary, for example, when the digital watermark information is copy-generation limitation information or number-of-copies limitation information.

Data output from the digital watermark information rewrite circuit 122 is supplied to a compression circuit 123 where it will be compressed. The compressed data from the compression circuit 123 is supplied to an encryption circuit 124 where it will be encrypted and supplied to a selector 126.

Data outputted from the selector 86 when the system controller 400 has judged the medium to be played is a secure one is supplied to a playing control circuit 92 and DRM information decryption circuit 91, and also to a recording control circuit 125. The recording control circuit 125 is controlled by the system controller 400 according to DRM information detected by the DRM information decryption circuit 91. Data output from the recording control circuit 125 is supplied to the selector 126.

Like the selector 86, the selector 126 is selected with a selection control signal from the system controller 400 depending upon whether the medium to be played is a secure or insecure one. Data output from the selector 126 is supplied to an ECC encoder 127 where it will have an error correction code added thereto and supplied to a recording modulation circuit 128 where it will be modulated for recording. Then, the recording-modulated data is supplied to a write head 129 and written to a disc 131 being rotated by a spindle motor 130. The scanning position of the laser beam from the write head 129 over the disc 131 and rotation velocity of the spindle motor 130 are controlled by a servo circuit 132.

Figure 15:
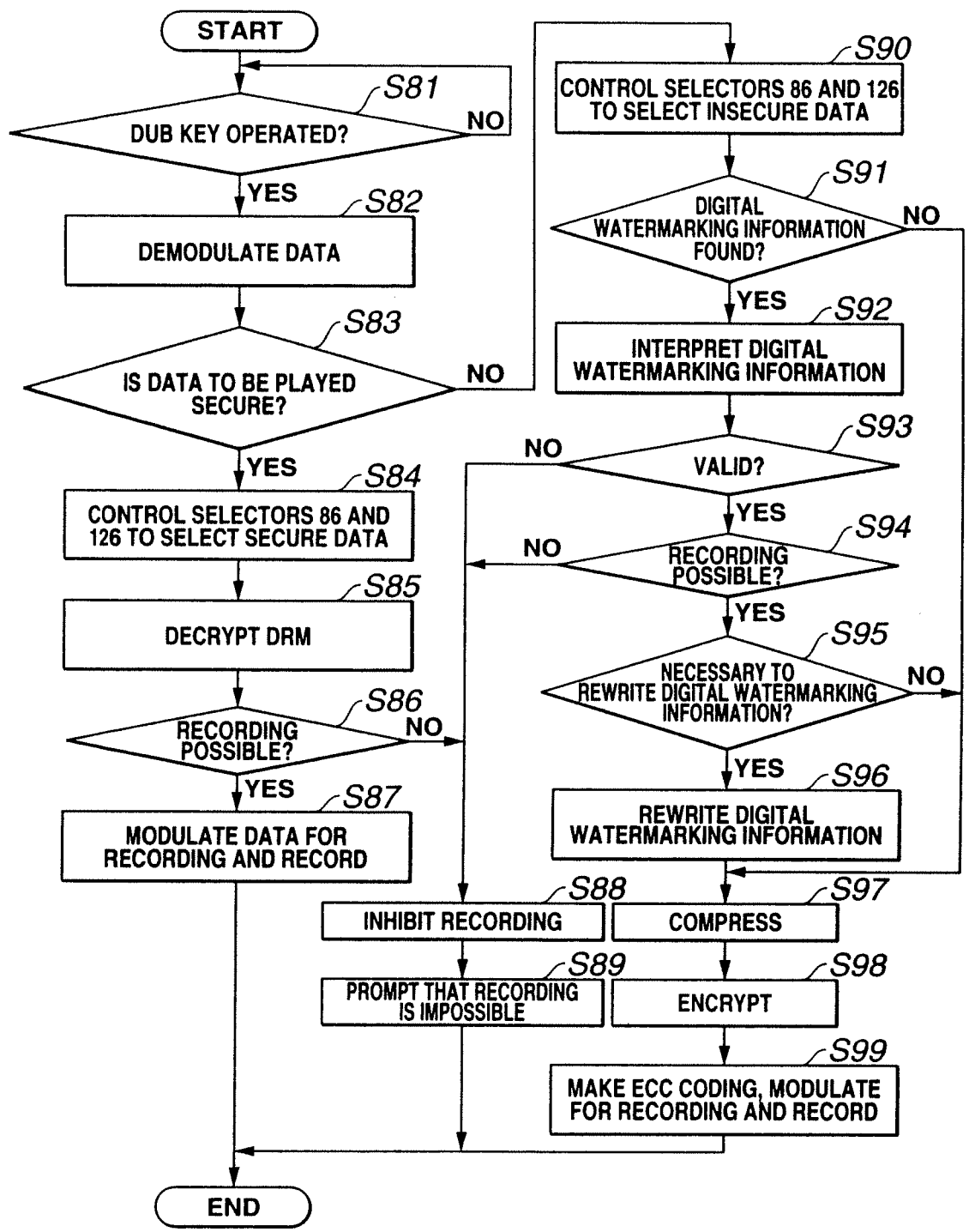
FIG. 15 is a flow chart showing operations made for data recording in the data recording/playing apparatus shown in FIG. 14.

Next, operations made for data recording/playing in the data recording/playing apparatus 120 constructed as above will be described with reference to the flow chart in FIG. 15. It should be noted that these flow chart shows the operations made mainly under the control of the system controller 400.

First in step S81, the system controller 400 judges whether the dubbing key on a key-control unit 112 has been operated. When it is judged that the dubbing key has been operated, the system controller 400 goes to step S82 where it will read data from the disc 81, demodulate it and make ECC decoding of it. Next i step S83, the system controller 400 judges whether data to be played is secure or not. It should be noted that a medium to be played such as CDx, CDx-R or CDx-RW is judged to be secure while one such as CD, CD-R or CD-RW is judged to be insecure, as having previously been described.

When it is judged in step S83 that the medium is a secure one, the system controller 400 goes to step S84 where it will control the selector 86 to output the data to the playing control circuit 92, and the selector 126 to select the data from the recording control circuit 125. Then the system controller 400 interprets the DRM information from the DRM information decryption circuit 91 in step S85 and judges, in step S86, whether recording for copying is possible.

When it is judged that the recording for copying is possible, the system controller 400 goes to step S87 where it will control the recording control circuit 125 to a recording-allowed state and the selector 126 to supply the data to a write head 129 via the ECC encoder 127 and recording modulation circuit 128. Thus the write head 129 writes the data to the disc 131.

On the other hand, when it is judged in step S86 based on the result of DRM information decryption that the recording for copying is impossible, the system controller 400 goes to step S88 where it will control the recording control circuit 125 to a recording-inhibited state to inhibit data recording, and goes to step S89 where it will control the LCD unit 113 to prompt the user, by display, that the recording is impossible.

Also when it is judged in step S83 that the medium is an insecure one, the system controller 400 goes to step S90 where it will control the selector 86 to output data to the playing control circuit 87 and the selector 126 to select data from the encryption circuit 124.

Next in step S91, the system controller 400 judges whether digital watermark information is embedded in audio PCM data to be recorded, by controlling the digital watermark information detection circuit 88 to detect digital watermark information in the data from the selector 86 for a predetermined length of time and checking whether digital watermark information can have been detected within the predetermined length of time. When digital watermark information can have been detected, the system controller 400 interprets the detected digital watermark information in step S92, and judges, in step S93, whether the detected digital watermark information is valid or not. This judgment is intended to see whether the digital watermark information has been falsified to have contents which cannot normally be.

When it is judged in step S93 that the detected digital watermark information is valid, the system controller 400 goes to step S94 where it will judge, according to the result of digital watermark information interpretation, whether the recording of the data for copying is possible.

When the detected digital watermark information is judged in step S93 to be invalid or when it is judged in step S94 that the recording for copying is impossible, the system controller 400 goes to step S88 where it will inhibit the recording, and then to step S89 where it will control the LCD unit 113 to prompt the user, by display, that the recording for copying is impossible.

When it is judged in step S94 that the recording for copying is possible, the system controller 400 goes to step S95 where it will judge whether the digital watermark information has to be rewritten or not. When the result of judgment is that the recording for copying needs rewrite of the digital watermark information for the purpose of limitation of copy generation and limitation of number of copies, the system controller 400 goes to step S96 where it will control the digital watermark information rewrite circuit 122 to rewrite the digital watermark information.

After completion of the digital watermark information rewriting or when it is judged that the digital watermark information has not to be rewritten, the PCM data is compressed in step S97, encrypted in step S98, and ECC-coded and modulated for recording and then recorded in step S99.

Note that in this embodiment, when it is judged in step S91 that the digital watermark information cannot be detected, the system controller 400 goes to step S97 and subsequent steps to record the PCM data. This is intended because there exists a conventional content having no digital watermark information embedded therein or a content unknown as to how it has been protected against copying. However, since such a content not known as to how it has been protected against copying is also unclear as to how it has been routed, it may be inhibited from being recorded.

As having been described in the foregoing, since the data recording/playing apparatus is designed not to detect any digital watermark information when the input route is secure, it can record data entered via a secure route for copying very simply and with a highly improved performance. That is, with the conventional data recorded shown in FIG. 1, even a data entered via a secure route has to be decrypted and decompressed for the purpose of detecting digital watermark information, if any, embedded in the data and has to be compressed and encrypted again for recording. In comparison with the above conventional data recording apparatus, however, the embodiment of the data recording/playing apparatus according to the present invention, having been described with reference to FIG. 14, needs no circuits for such data decompression, decryption, compression and encryption. In the case in which only secure data is reproduced, the embodiment does not need digital watermark information detection circuit and recording control circuit based on the detection circuit.

Note that the aforementioned secure medium is just an example and the media and interfaces may be classified depending upon whether they are so secure as to make unnecessary the detection of digital watermark information. Also, as previously mentioned, the data encryption is not essential for the medium or interface being secure. Further, in the aforementioned data recording/playing apparatus, each storage medium to which data is recorded or from which data is reproduced is a removable one but data can of course be recorded to and/or reproduced from a removable storage medium used in a hard disc drive or the like.

[Data Playing Apparatus]

Figure 16:
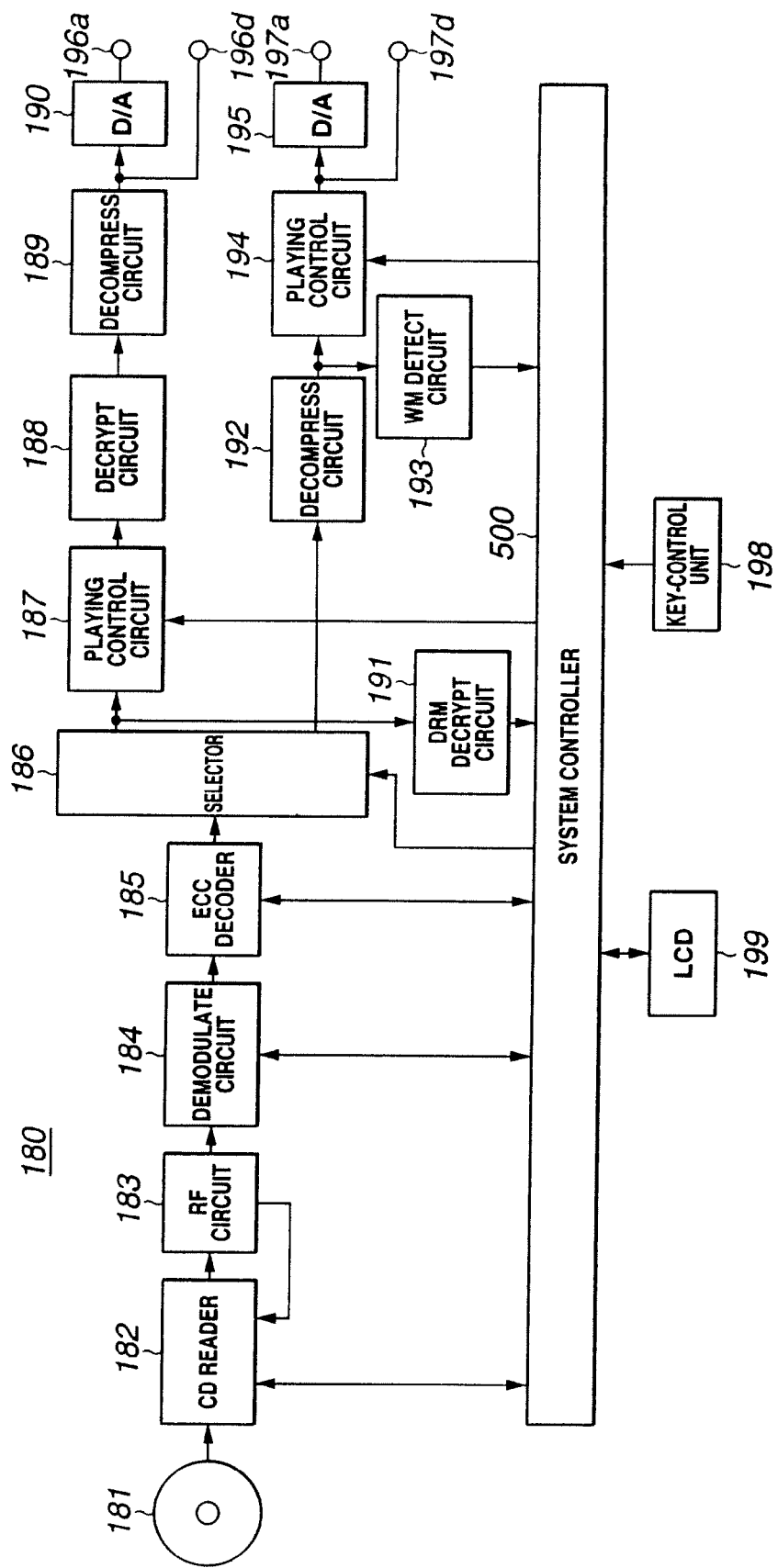
FIG. 16 is a block diagram of still another embodiment of the data playing apparatus according to the present invention.

Referring now to FIG. 16, still another embodiment of the data playing apparatus according to the present invention is schematically illustrated in the form of a block diagram. The data recording apparatus is generally indicated with a reference 180. In this embodiment, when a loaded disc 181 is CDx and data recorded therein has been encrypted, the data is played without detecting any digital watermark information. Also in this case, however, the playing is controlled according to DRM information.

When the loaded disc 181 is a conventional CD or CD-R, if data from the disc 181 has digital watermark information added thereto, the digital watermark information is detected and the playing is controlled based on the result of detection to reproduce the data.

As shown, the data playing apparatus 180 includes a reader 182 for the CD-type disc 181. The reader 182 has an optical pickup (not shown). Data read by the pickup is supplied to a demodulation circuit 184 via an RF circuit 183. The data having been modulated for recording is thus demodulated in the demodulation circuit 184. The demodulated data is supplied to an ECC decoder 185 where it will be error-corrected. Data output from the ECC decoder 185 is supplied to a selector 186.

TOC information and file header of the data error-corrected by the ECC decoder 185 are supplied to a system controller 500. This system controller 500 judges, based on the TOC information and file header, whether data recorded in the loaded disc 181 has been encrypted or not, and supplies a control signal for selection of a selector 186 to the selector 186.

When the system controller 500 judges that the data recorded in the loaded disc 181 has been encrypted, the selector 186 supplies output data to a playing control circuit 187, and to a DRM information decryption circuit 191. The DRM information decryption circuit 191 detects and decrypts DRM information and supplies the result of decryption to the system controller 500. Then the system controller 500 interprets the DRM information to judge whether the playing should be allowed or not, and controls the playing control circuit 187 according to the result of judgment.

That is, when the playing is allowed, the playing control circuit 187 outputs the data to a decryption circuit 188. The data is decrypted in the decryption circuit 188, and then the decrypted data is supplied to a decompression circuit 189 where it will be decompressed. Output data from the decompression circuit 189 is led to a digital output terminal 196b, and passed to a D/A converter 190 where it will be converted to analog data. The analog data is led to an analog output terminal 196a.

When the playing is inhibited, the system controller 500 supplies the control signal to a playing control circuit 194. The control signal inhibits the playing control circuit 194 from outputting the data.

When the system controller 500 judges that the data recorded in the loaded disc 181 has not been encrypted, the selector 186 supplies output data to a decompression circuit 192. The decompression circuit 192 decompresses the supplied compressed data, and supplies the decompressed data to a digital watermark information detection circuit 193 and playing control circuit 194.

The digital watermark information detection circuit 193 detects digital watermark information, and supplies the result of detection to the system controller 500. The system controller 500 interprets the digital watermark information to judge whether the playing should be allowed or inhibited, and controls the playing control circuit 194 according to the result of judgment.

That is, when the playing is allowed, the playing control circuit 194 outputs the data and this data is led to a digital output terminal 197b and also to a D/A converter 195 where it will be converted to analog data. The analog data is led to an analog output terminal 197a. When the playing is inhibited, the system controller 500 supplies a control signal to the playing control circuit 194 which will thus be inhibited with the control signal from outputting the data.

Note that the system controller 500 has connected thereto a key-control unit 198 for operation by the user to designate playing or the like, and an LCD unit 199 to display necessary information.

Figure 17:
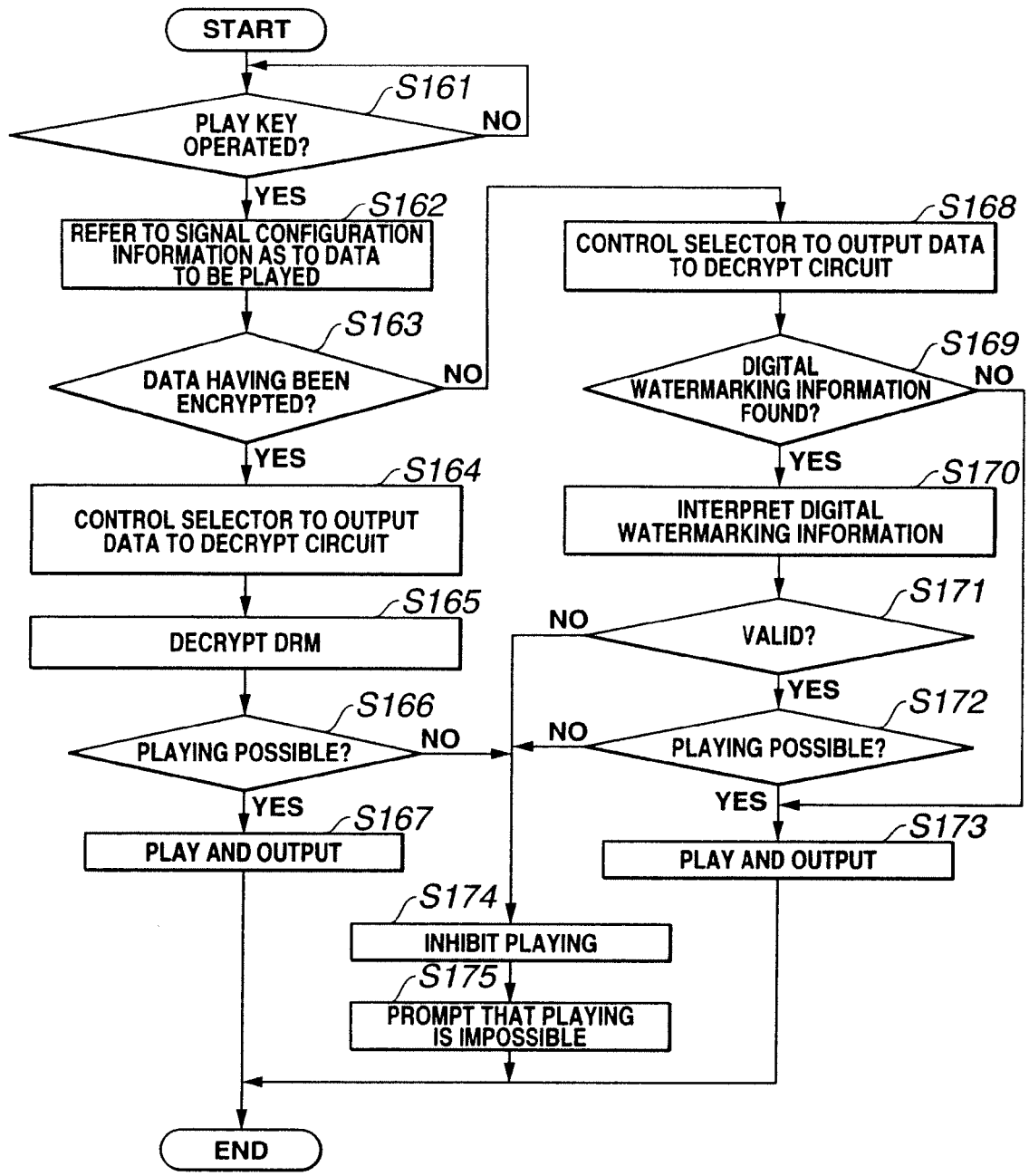
FIG. 17 is a flow chart showing operations made for data reproduction in the data playing apparatus shown in FIG. 16.

Next, operations made for data playing in the data playing apparatus 180 constructed as having been described above will be described with reference to the flow chart shown in FIG. 17. It should be noted that these flow chart show the operations made mainly under the control of the system controller 500.

First in step S161, the system controller 500 judges whether the play key on the key-control unit 198 has been operated by the user. When the result of judgment is that the play key has been pressed, the system controller 500 goes to step S162 where it will refer to the signal configuration information as to the data supplied from the ECC decoder 185, namely, to TOC information and file header of the data recorded in the disc 181, and goes to step S163 where it will judge whether the data read from the disc 181 has been encrypted or not.

When the result of judgment in step S163 is that the data read from the disc 181 has been encrypted, the system controller 500 goes to step S164 where it will control the selector 186 to supply the data to the playing control circuit 187. Thus, detection of digital watermark information will not be effected. Then the system controller 500 goes to step S165 where it will interpret the result of DRM information decryption from the DRM information decryption circuit 191, and then to step S166 where it will judge whether the playing is possible. When the result of judgment is that the playing is possible, the system controller 500 goes to step S167 where it will control the playing control circuit 187 to the aforementioned playing-allowed state.

Thus, the data from the playing control circuit 187 is decrypted in the decryption circuit 188, and the decompressed data is decompressed in the decompression circuit 189, and outputted via the digital output terminal 196*d*, and to the D/A converter 190 where it will be converted to analog data. The analog data is outputted via the analog output terminal 196*a*. Since detection of digital watermark information and playing control based on the result of digital watermark information detection are not effected at this time, the performance from the operation of the play key until the sound reproduction is very good.

On the other hand, if it is judged in step S166 that the playing is impossible as the result of DRM information interpretation means, the system controller 500 goes to step S174 where it will control the playing control circuit 187 to inhibit the playing as above, and goes to step S175 where it will cause the LCD unit 199 to prompt the user, by display, that the playing is impossible.

Also, when it is judged in step S163 that the data read from the disc 181 has not been encrypted, the system controller 500 goes to step S164 where it will control the selector 186 to supply the data to the decompression circuit 192. Thus, digital watermark information is detected. Then the data decompressed by the decompression circuit 192 is supplied to the digital watermark information detection circuit 193 where the data will be subjected to detection of digital watermark information. The system controller 500 refers to the output from the digital watermark information detection circuit 193 to judge whether digital watermark information is embedded in the data or not.

That is, in step S169, the system controller 500 monitors the output from the digital watermark information detection circuit 193 to judge whether digital watermark information is embedded in audio PCM data to be played. For the purpose of this judgment, the system controller 500 causes the digital watermark information detection circuit 193 to detect digital watermark information in the audio PCM data for more a predetermined length of time in order to see whether digital watermark information can thus be detected or not. When digital watermark information can have been detected in the data, the system controller 500 goes to step S170 where it will interpret the digital watermark information and then goes to step S171 where it will judge whether the detected digital watermark information is valid or not. This judgment is intended to see whether the digital watermark information has been falsified to have contents which cannot normally be.

When it is judged in step S171 that the detected digital watermark information is valid, the system controller 500 goes to step S172 where it will judge, according to the result of interpretation, whether the playing of the data is possible.

When it is judged in step S171 that the digital watermark information is not valid or when it is judged in step S172 that the playing is impossible, the system controller 500 goes to step S174 where it will control the playing control circuit 194 to a playing-inhibited state to inhibit the playing. Also, when it is judged in step S172 that the playing is possible, the system controller 500 goes to step S173 where it will control the playing control circuit 194 to a playing-allowed state to effect the playing.

Note that in this embodiment, when it is judged in step S169 that the digital watermark information cannot be detected, the system controller 500 goes to step S173 and subsequent steps to play the data. This is intended because there exists a conventional content having no digital watermark information embedded therein or a content unknown as to how it has been protected against playing. However, since such a content not known as to how it has been protected against playing is also unclear as to how it has been routed, it may be inhibited from being played.

[Data Recording Apparatus]

Figure 18:
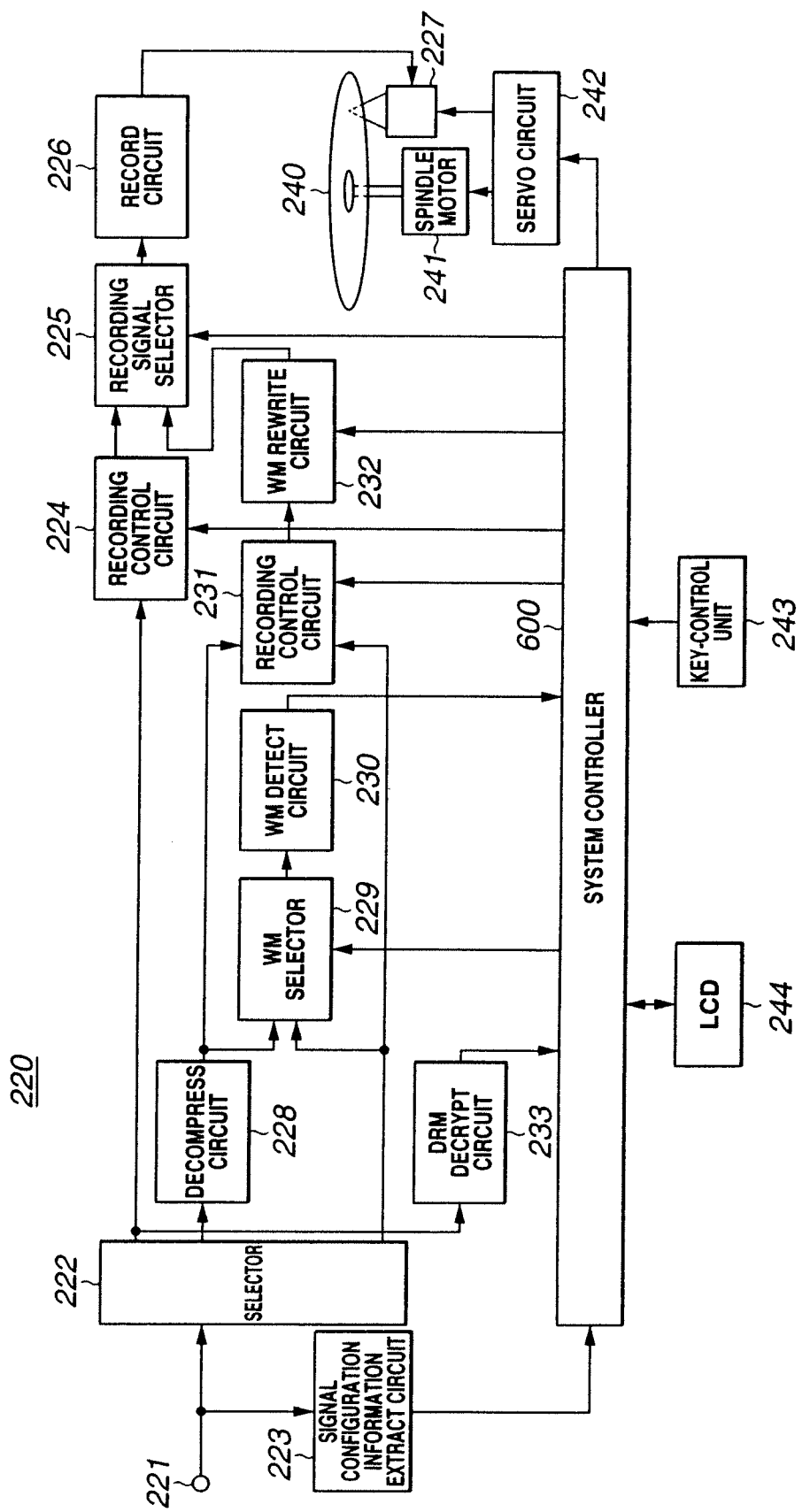
FIG. 18 is a block diagram of another embodiment of the data recording apparatus according to the present invention.

Referring now to FIG. 18, another embodiment of the data recording apparatus according to the present invention is schematically illustrated in the form of a block diagram. The data recording apparatus is generally indicated with a reference 220. The data recording apparatus 20 having previously been described with reference to FIG. 3 is provided with a plurality of digital terminals, but the data recording apparatus 220 shown in FIG. 18 is provided with only a single digital input terminal 221 which is supplied with encrypted digital data and also non-encrypted digital data. Encrypted data includes ones having been compressed or not compressed, and non-encrypted data include one having been compressed or not compressed. In this embodiment, any of such data is supplied to the data recording apparatus 220 via the digital input terminal 221.

Note that as in the data recording apparatus 20 shown in FIG. 3, the data recording apparatus 220 uses a CD-R, CD-RW or an optical disc capable of recording with a density double that of the former. Also, the data recording apparatus 220 supports digital watermark information embedded in audio data being in the state of PCM signal.

Digital watermark information is embedded in audio data by inserting it at lower bits of the PCM signal, embeding it under the masking effect, embeding it around a high-energy part of audio data, embeding it at an orthogonal transform coefficient or embeding it by the spectrum spreading, for example.

Also, data entered via the digital input terminal 221 is in the form of a file. As having previously been described with reference to FIG. 9, the file header includes signal configuration information such as a content ID, encryption information, encryption technique information, WM (information indicating whether digital watermark information is embedded or not), WMID (identification information for digital watermark information), content type, and compression information.

The data recording apparatus 220 is also provided with a key-control unit 243 having provided thereon a plurality of keys such as recording start and stop keys in addition to the input select key. A key-operation signal produced by the user operating a corresponding key is supplied to a system controller 600.

The system controller 600 includes for example a microcomputer, and interprets the key-operation signal supplied from the key-control unit 243 to judge which key has been operated, and provides a control corresponding to the result of judgment. It should be noted that the data recording apparatus 220 is provided with an LCD unit 244 for example in this embodiment (the LCD unit 244 is connected to the system controller 600), as a display device to inform the user of which key has been operated and display information having to be given to any other use. When a recording start command is entered by the user operating the key-control unit 243, the system controller 600 controls each of components of the data recording apparatus 220 to start recording digital data supplied via the digital input terminal 221. The digital input terminal 221 is supplied with digital audio data, and supplies it to a selector 222 and signal configuration information extraction circuit 223. The signal configuration information extraction circuit 223 extracts information incidental to the supplied data, or information in the header of a content data in this embodiment, and supplies it to the system controller 600.

According to information from the signal configuration information extraction circuit 223, the system controller 600 judges whether the data supplied via the digital input terminal 221 has been encrypted or not. When the data is not a one having been encrypted, the system controller 600 judges whether the data is a one having been compressed. Based on the result of this judgement, the system controller 600 selects any of a selector 222, recording signal selector 225 and digital watermark information selector 229 (WM selector in FIG. 18).

In the data recording apparatus 220, when the data supplied via the digital input terminal 221 is a one having been encrypted, the system controller 600 will select the selector 222 whether the data has been compressed or not to supply the supplied data to a recording control circuit 224 and DRM information decryption circuit 233, and selects the recording signal selector 225 to output the data from the recording control circuit 224.

Also, when the data supplied via the digital input terminal 221 is a one having been encrypted and also compressed, the system controller 600 selects the selector 222 to supply the supplied data to a decompression circuit 228, and select the recording signal selector 225 to output the data from a digital watermark information rewrite circuit 232 (WM rewrite circuit in FIG. 18), and further the digital watermark information selection 229 to output the data from the decompression circuit 228.

When the data supplied via the digital input terminal 221 is a one having been neither encrypted nor compressed, the system controller 600 selects the selector 222 to supply the supplied data to the digital watermark information selector 229 and also to a recording control circuit 231, selects the recording signal selector 225 to output the data from the digital watermark information rewrite circuit 232, and further selects the digital watermark information selector 229 to output the data from the selector 222.

As above, the selector 222 is provided to change the destination to which the supplied data is to be outputted according to a selection control signal from the system controller 600. When the data supplied via the digital input terminal 221 is a data having been encrypted and supplied to the recording control circuit 224 and DRM decryption circuit 233 via the selector 222, it will not be subjected to detection of digital watermark information but it will be controlled according to DRM (digital rights management) information incidental thereto.

As previously described, the DRM information can be used to easily separate copyright management information such as SCMS information or the like from even data having been encrypted and compressed. When DRM information is accompanying the data entered via the digital input terminal 221, the DRM information decryption circuit 233 decrypts the DRM information and supplies the result of interpretation to the system controller 600.

When the recording for copying is inhibited according to the result of DRM information decryption, the system controller 600 controls the recording control circuit 224 to stop supplying the data to the downstream circuits. Also, when the recording for copying is allowed, the system controller 600 will control the recording control circuit 224 to supply the data to the downstream circuits, thereby allowing the recording for copying.

Audio data from the recording control circuit 224 is supplied to the recording signal selector 225. In this case, the recording signal selector 225 is supplied with the selection control signal from the system controller 600 and switched to output the signal from the recording control circuit 224.

Thus, the data from the recording control circuit 224 is supplied to a recording circuit 226 where it will be converted to signals to be recorded. The signals are supplied to a write head 227 via a recording amplifier (not shown). The write head 227 writes data to an optical disc 240 being rotated by a spindle motor 241 at a predetermined velocity under a CLV servo control of a servo circuit 242.

The servo circuit 242 produces a velocity servo signal based on the data to be recorded for example, ans. supplies it to the spindle motor 241. The servo circuit 242 is supplied with a control signal from the system controller 600 to position the write head 227 radially of the optical disc 240, and also in the track direction.

As above, the encrypted data supplied to the data recording apparatus 220 is recorded to the optical disc 240. In this case, the encrypted data supplied to the data recording apparatus 220 is recorded for copying as it is encrypted to the optical disc 240.

In case the optical disc 240 is a CD-R, the write had 227 records data by changing the refractive index of the recording layer of the optical disc 240. Also, when the optical disc 240 is a CD-RW, the write head 227 records data by changing the crystalline/amorphous state of the optical disc 240.

Also, when the data supplied via the digital input terminal 221 is a one having not been encrypted but compressed and supplied to the decompression circuit 228 via the selector 222, it will be decompressed in the decompression circuit 228, and then supplied to the digital watermark information selector 229 and recording control circuit 231. In this case, as having previously been described, the digital watermark information selector 229 is switched by the system controller 600 to output the data from the decompression circuit 228, and so the decompressed data from the decompression circuit 228 will be supplied to a digital watermark information detection circuit 230.

When the data from the digital watermark information selector 229 has digital watermark information embedded therein, the above digital watermark information detection circuit 230 detects the digital watermark information, and supplies the result of detection as copyright management information to the system controller 600. The system controller 600 will interpret the copyright management information. When the copyright management information is interpreted to mean that the copying is inhibited, the system controller 600 will control the recording control circuit 231 to inhibit the recording. That is, the system controller 600 inhibits the recording control circuit 231 from supplying the data to the circuits downstream of the circuit 231.

Also, the copyright management information is judged to mean that the recording for copying is possible like "one copy allowed" or "copy-free", the system controller 600 controls the recording control circuit 231 to output the data to the downstream circuits, thereby allowing the data recording for copying. Thus, the data from the recording control circuit 231 is supplied to the digital watermark information rewrite circuit 232. Even when the copy control information included in the copyright management information allows the recording for copying, the system controller 600 will control the digital watermark information rewrite circuit 232 to rewrite the digital watermark information from "one copy allowed" to "copy inhibited" or to a one for a reduced number of times the data can be copied, if the copy control information limits the copy generation or number of copies.

When it is not necessary to rewrite the digital watermark information, the digital watermark information rewrite circuit 232 is bypassed or passed through.

In this embodiment, the data from the digital watermark information rewrite circuit 232 is supplied to the recording signal selector 225. In this case, since the recording signal selector 225 is switched with the selection control signal from the system controller 600 to supply the data from the digital watermark information rewrite circuit 232 to the recording circuit 226, the data from the digital watermark information rewrite circuit 232 is recorded to the optical disc 240 via the write head 227 as in the aforementioned recording of the encrypted data.

Also, when the data supplied via the digital input terminal 221 is a one having neither been encrypted nor compressed and supplied to the digital watermark information selector 229 and recording control circuit 231 via the selector 222, the digital watermark information selector 229 is switched by the system controller 600 as above to output the data from the selector 222. So, the data from the selector 222 will be supplied to the digital watermark information detection circuit 230.

When the data from the digital watermark information selector 229 has digital watermark information added thereto, the digital watermark information detection circuit 230 detects the digital watermark information as above, and supplies the result of detection as copyright management information to the system controller 600. The system controller 600 interprets the copyright management information, and controls the recording control circuit 231 according to the interpreted copyright management information as above.

Thus, when the copyright management information embedded as digital watermark information in the data means that the copying is inhibited, the system controller 600 controls the recording control circuit 231 to inhibit the recording. Also, when the copyright management information means, as the result of interpretation, that the recording for copying is possible like "one copy allowed" or "copy-free", the system controller 600 controls the recording control circuit 231 to output the data to the downstream circuits, thereby allowing the recording for copying. The data from the recording control circuit 231 is supplied to the digital watermark information rewrite circuit 232. Even when the copy control information included in the copyright management information allows the recording for copying, the system controller 600 controls the digital watermark information rewrite circuit 232 to rewrite the digital watermark information if the digital watermark information embedded in the data to be recorded to the optical disc 240 has to be rewritten, like "one copy allowed". When the digital watermark information has not to be rewritten, the digital watermark information rewrite circuit 232 will be bypassed or passed through. Then the data from the digital watermark information rewrite circuit 232 is supplied to the recording signal selector 225. Also in this case, the recording signal selector 225 is switched with the selection control signal from the system controller 600 to output the data from the digital watermark information rewrite circuit 232, such that the data from the digital watermark information rewrite circuit 232 is supplied to the recording circuit 226 and thus recorded to the optical disc 240 via the write head 227 as in the aforementioned recording of encrypted data and recording of data having not been encrypted but compressed.

As above, the data recording apparatus 220 refers to the signal configuration information supplied incidentally to the digital data supplied via the digital input terminal 211 and including a content ID, encryption information, encryption technique information, WM information (indicating whether digital watermark information is embedded in the data), WMID information (digital watermark information ID), content type, compression information indicating whether the data has been compressed or not, etc., and controls the data recording according to the DRM information when the supplied data is a one having been encrypted. But, the data recording apparatus 220 basically allows to record the supplied data as it is.

When the supplied data is a one having not been encrypted, the system controller 600 causes the digital watermark information detection circuit 230 to detect digital watermark information embedded in the data, and controls the recording according to the copyright management information indicated by the digital watermark information.

Thus, since encrypted data can be protected from being illegally used, detection of digital watermark information is not effected, the data recording apparatus 220 cannot be applied with any heavy load and function with an improved performance. Also, since non-encrypted data can be controlled for recording according to copyright management information indicated by digital watermark information embedded in the non-encrypted data, the data can be protected from being illegally copied.

Next, operations made for data playing in the data playing apparatus 220 constructed as having been described above will be described with reference to the flow chart shown in FIGS. 19 and 20. It should be noted that these flow chart show the operations made mainly under the control of the system controller 600.

First in step S181, the system controller 600 judges whether the record key on the key-control unit 243 has been operated by the user. When the result of judgment is that the record key has been pressed, the system controller 600 goes to step S182 where it will refer to the signal configuration information extracted by the signal configuration information extraction circuit 223, and goes to step S183 where it will judge whether the supplied data is a one having been encrypted.

When the result of judgment in step S183 is that the supplied data has been encrypted, the system controller 600 goes to step S184 where it will switch the selector 222 to output the data to the recording control circuit 224, and also the recording signal selector 225 to output the data from the recording control circuit 224. Then the system controller 600 goes to step S185 where it will interpret the result of DRM information decryption from the DRM information decryption circuit 233, and then to step S186 where it will judge whether the recording for copying is possible. When the result of judgment is that the recording is possible, the system controller 600 goes to step S187 where it will control the recording control circuit 224 to the aforementioned recording-allowed state to supply the data from the recording signal selector 225 to the write head 227 via the recording circuit 226 and thus the write head 227 will write the data to the optical disc 240.

On the other hand, if it is judged in step S186 that the recording for copying is impossible as the result of DRM information interpretation means, the system controller 600 goes to step S188 where it will control the recording control circuit 224 to the aforementioned recording-inhibited state to inhibit the recording as above, and goes to step S1189 where it will cause the LCD unit 244 to prompt the user, by display, that the recording is impossible.

Figure 20:
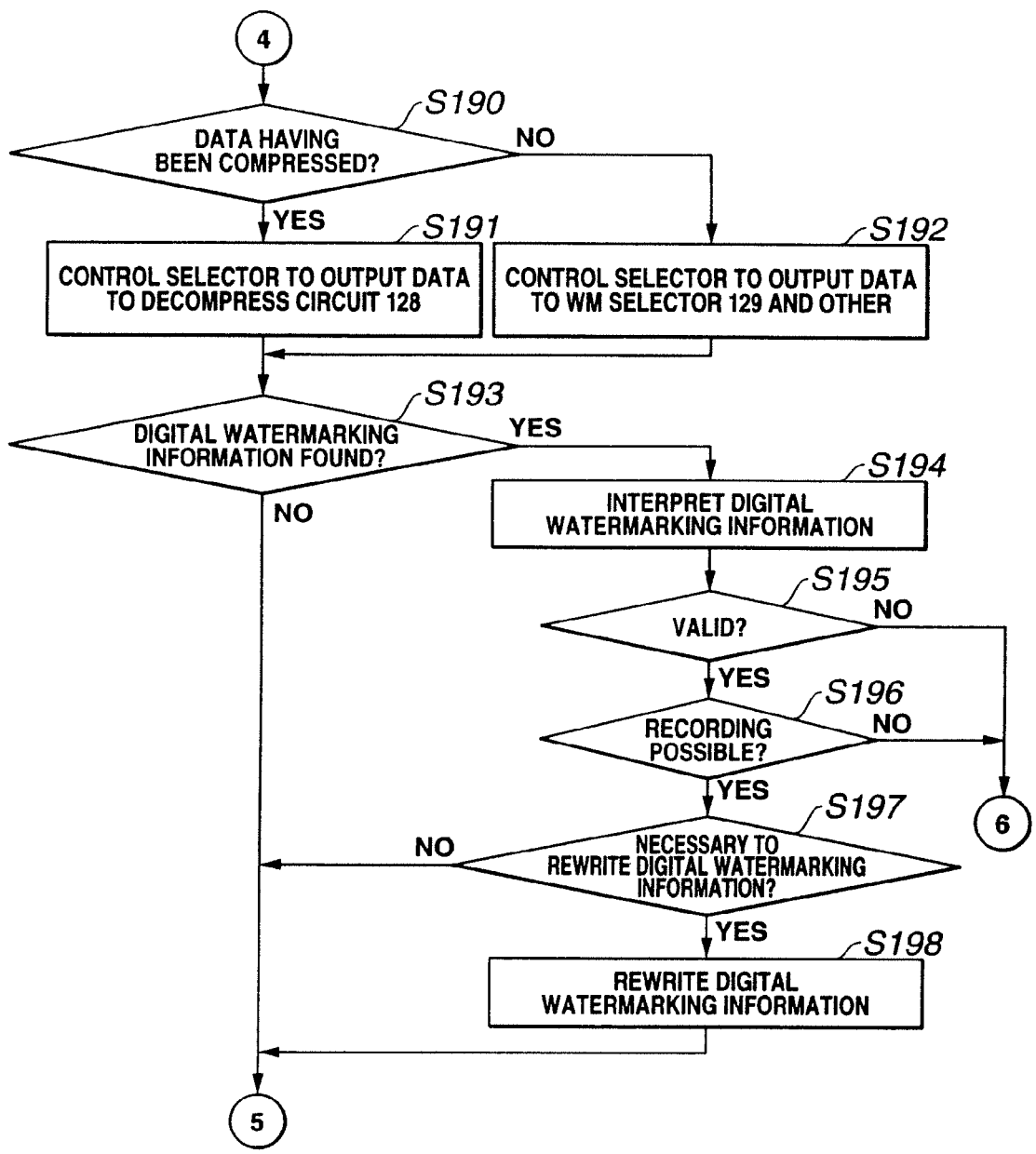
FIG. 20 is a flow chart showing operations made for data recording in the data recording apparatus shown in FIG. 18.

Also, when it is judged in step S183 that the supplied data is a one having not been encrypted, the system controller 600 goes to step S190 in FIG. 20 where it will judge whether the supplied data is a one having been compressed or not.

When the result of judgment in step S190 is that the supplied data is a one having been compressed, the system controller 600 goes to step S191 where it will switch the selector 222 to output the data to the decompression circuit 228, the recording signal selector 225 to output the data from the digital watermark information rewrite circuit 232, and also the digital watermark information selector 229 to output the data from the decompression circuit 228.

When it is judged in step S190 that the supplied data is a non-compressed data, the system controller 600 goes to step S192 where it will switch the selector 222 to output the data to the digital watermark information selector 229 and recording control circuit 231, the recording signal selector 225 to output the data from the digital watermark information rewrite circuit 232, and the digital watermark information selection 229 to output the data from the selector 222.

After step S191 or after completion of the operation in step S1192, the system controller 600 goes to step S193 where it will judge, based on the detection output from the digital watermark information detection circuit 230, whether the data to be recorded has digital watermark information embedded therein. For the purpose of this judgment, the system controller 600 causes the digital watermark information detection circuit 230 to detect digital watermark information in the data from the digital watermark information selector 229 for a predetermined length of time in order to see whether digital watermark information can thus be detected or not within the predetermined time length. When digital watermark information can have been detected in the data, the system controller 600 goes to step S194 where it will interpret the digital watermark information and then goes to step S195 where it will judge whether the detected digital watermark information is valid or not. This judgment is intended to see whether the digital watermark information has been falsified to have contents which cannot normally be.

When the detected digital watermark information is judged to be valid, the system controller 600 goes to step S196 where it will judge whether the result of interpretation of the digital watermark information, that is, of the copyright management information, means that the data can be recorded for copying.

Figure 19:
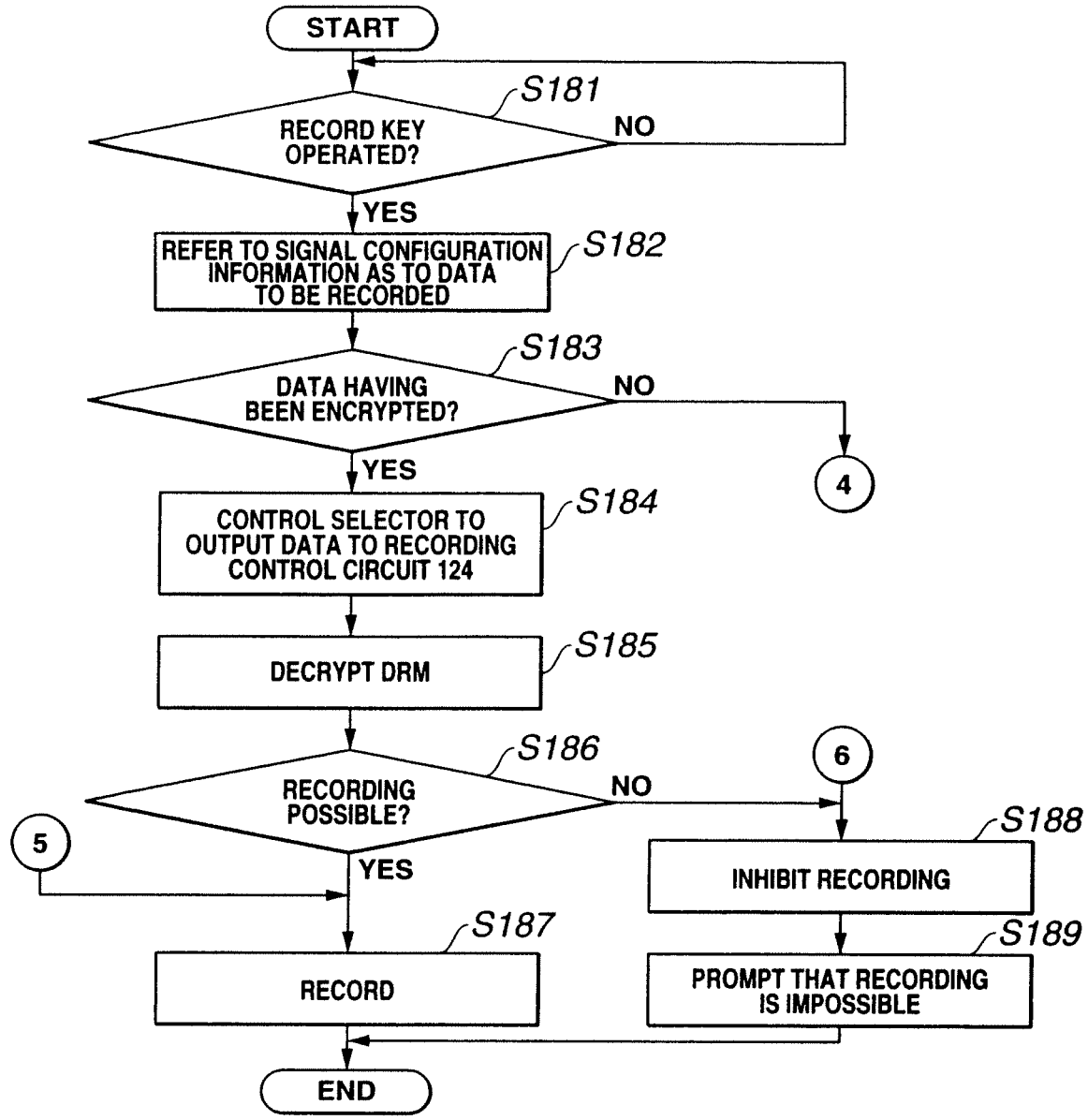
FIG. 19 is a flow chart showing operations made for data recording in the data recording apparatus shown in FIG. 18.

When it is judged in step S195 that the detected digital watermark information is not valid or when it is judged in step S196 that the recording for copying is impossible, the system controller 600 goes to step S1188 shown in FIG. 19 where it will inhibit the recording. Then it goes to step S189 where it will control the LCD unit 244 to prompt the user, by display, that the recording is impossible.

When it is judged in step S196 that the recording for copying is possible, the system controller 600 goes to step S197 where it will judge whether the digital watermark information has to be rewritten. When it is judged that the control of the recording for copying needs rewriting of the digital watermark information for the purpose of limiting the copy generation or number of copies, the system controller 600 goes to step S198 where it will control the digital watermark information rewrite circuit 232 to rewrite the digital watermark information.

After completion of the digital watermark information rewriting or when it is judged that the digital watermark information has not to be rewritten, the system controller 600 goes to step S187 in FIG. 19 to record the data.

Note that also in this data recording apparatus 220, when it is judged in step S193 that no digital watermark information can be detected, the system controller 600 goes to step S187 and subsequent steps where the data will be recorded. This is intended because there exists a conventional content having no digital watermark information embedded therein or a content unknown as to how it has been protected against copying. However, since such a content not known as to how it has been protected against copying is also unclear as to how it has been routed, it may be inhibited from being recorded.

As having been described in the foregoing, since the data recording apparatus 220 is designed not to detect any digital watermark information when the data to be recorded is an encrypted one, it can record the encrypted data for copying very simply and with a highly improved performance. That is, with the conventional data recorded shown in FIG. 1, even an encrypted data has to be decrypted and decompressed for the purpose of detecting digital watermark information, if any, embedded in the data and has to be compressed and encrypted again for recording. In comparison with the above conventional data recording apparatus, however, the embodiment of the data recording apparatus according to the present invention, having been described with reference to FIG. 3, needs no circuits for such data decompression, decryption, compression and encryption.

Note that in the aforementioned embodiments, encrypted data is not subjected to detection of additional information such as digital watermark information embedded in the encrypted data, while non-encrypted data is subjected to the detection of additional information such as digital watermark information embedded in the non-encrypted data. However, the present invention is not limited to this system design.

For example, a data recorded having no decompression circuit will not be able to detect any digital watermark information having been embedded in a data which is not yet compressed because it cannot decompress the data. In this case, digital watermark information may not be detected. That is, even in case a data having not been encrypted is processed, whether digital watermark information should be detected or not may be decided depending upon whether the data is a compressed or non-compressed one.

Also, in a data recording apparatus not including a digital watermark information detection circuit capable of discriminating the type of digital watermark information embedded in a file-form data to be processed according to signal configuration information supplied as added to a header of the data, namely, supplied incidentally to the data, even the object data having not been encrypted is not subjected to detection of digital watermark information. That is, even in case a non-encrypted data is processed, whether the data should be subjected to detection of digital watermark information may be decided according to the type of digital watermark information.

Similarly, in case a content type being signal configuration information supplied incidentally to an object data makes it clear that there is not provided a digital watermark information detection circuit for the type of digital watermark information embedded in the object data according or that no digital watermark information is embedded in the data, no digital watermark information may be detected in any non-encrypted data. That is, even for a non-encrypted content data, whether digital watermark information should be detected or not may be decided according to the type of the content data.

Of course, digital watermark information may not be detected in a non-encrypted data having no digital watermark information embedded therein, which is evident from signal configuration information incidental to the data. That is, whether digital watermark information should be detected or not may be decided depending upon whether an object data has digital watermark information embedded therein or not.

Also, in case a data format of an object data, being signal configuration information supplied incidentally to the data, makes it clear that there is not provided a digital watermark information detection circuit for the type of digital watermark information embedded in the object data according, no digital watermark information is embedded in the data, or that there is provided an illegal-use preventive feature adopting other copy control technique or playing control technique, no digital watermark information may be detected in any non-encrypted data. That is, even for a non-encrypted data, whether digital watermark information should be detected or not may be decided according to the format of the data. It should be noted that the data formats include various types such as CD, DVD and MD data formats.

Even a non-encrypted data may be recorded or played according to DRM information for example.

Also, even an encrypted data which however has not been encrypted exactly to the intended purpose of the encryption may be recorded or played according to detected digital watermark information detected from therein.

Also, in case it is possible to judge, based on predetermined signal configuration information such as data format or the like of a data, whether the data is a one having been encrypted or having not to be copied or played according to digital watermark information, whether digital watermark information should be detected or not may be decided according to the signal configuration information.

In the aforementioned embodiments, signal configuration information incidental to a content data to be recorded to an optical disc is stated in TOC or the like of the content data or added to a file header of a file-form content data. However, the present invention is not limited to the above.

A content data to be recorded to a storage medium such as an optical disc may be accompanied by signal configuration information added to the sector header and sub-code part thereof.

In the aforementioned embodiments, additional information is embedded in a content by digital watermarking. However, the present invention can cover data in which additional information has been embedded by any other technique.

In the aforementioned embodiments, audio signals are to be recorded or played. However, the data to be recorded or played is not limited to the audio signals but may be program data such as video data, text data or game.

Also, the storage medium is not limited to the optical disc but may be a memory card, hard disc or semiconductor memory for example.

[In case it is decided whether digital watermark information is to be detected or not, based on whether input data is a one having embedded therein digital watermark information difficult to detect (for the situation (2))]

[Data Recording Apparatus]

When digital watermark information is embedded in an audio PCM signal and the signal is converted to an analog signal, the embedded digital watermark information will be difficult to detect. The data recording apparatus according to the present invention is a solution to this problem.

Figure 21:
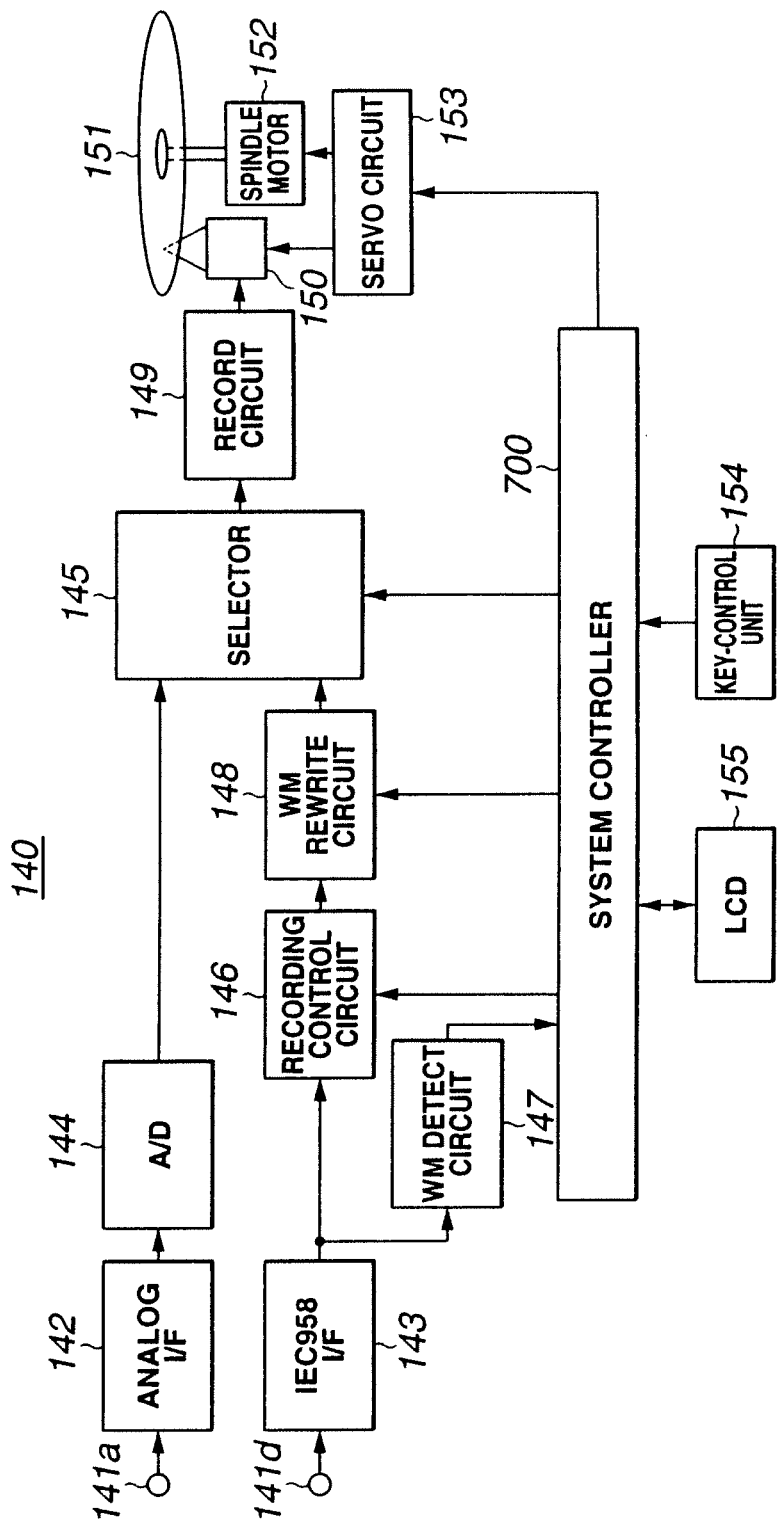
FIG. 21 is a block diagram of still another embodiment of the data recording apparatus according to the present invention.

Referring now to FIG. 21, still another embodiment of the data recording apparatus according to the present invention is schematically shown in the form of a block diagram. The data recorded is generally indicated with a reference 140. In this embodiment, a CD-R (compact disc-recordable), CR-RW (compact disc-rewritable) or an optical disc capable of recording with a density double that of the CD-R and CD-RW.

As shown in FIG. 21, the data recording apparatus 140 is provided with a plurality of external input terminals including an analog input interface 142 and IEC 958 interface 143.

The analog input interface 142 receives an analog audio signal entered via an analog input terminal 141*a* formed from a connector jack, supplies it to an A/D converter 144 in which it will be converted to an audio PCM signal. The audio PCM signal is supplied to a selector 145. The IEC 958 interface 143 receives an audio PCM signal entered via a so-called optical digital input terminal 141*d* and supplies it to a recording control circuit 146, and also to a digital watermark information detection circuit 147.

When the audio PCM signal from the IEC 958 interface 143 has additional information as a digital watermark embedded therein, the digital watermark information detection circuit 147 detects the digital watermark information and supplies the result of detection as copyright management information to a system controller 700 including a microcomputer for example.

The system controller 700 interprets the copyright management information. When the copyright management information means that the copying is inhibited, the system controller 700 controls the recording control circuit 146 to inhibit the recording. That is, the system controller 700 controls the recording control circuit 146 to stop supplying the audio PCM data to the circuits downstream of the circuit 146.

Also, when the result of interpretation of the copyright management information is judged to be "one copy allowed" or "copy-free", the system controller 700 controls the recording control circuit 146 to output the audio PCM signal to the circuits downstream of the circuit 146, thereby allowing the recording for copying. The audio data from the recording control circuit 146 is supplied to a digital watermark information rewrite circuit 148. Then, even if copy control information included in the copyright management information allows the recording for copying, the system controller 700 will control the digital watermark information rewrite circuit 148 to rewrite the digital watermark information from "one copy allowed" to "copy inhibited" or to a reduced number of times copy can be done when the copy generation or number of times of copying is to be limited, like "one copy allowed". When it is unnecessary to rewrite the digital watermark information, the digital watermark information rewrite circuit 148 will be bypassed or passed through. The audio PCM data from the digital watermark information rewrite circuit 148 is supplied to the selector 145.

The user selects one of the above external input interfaces from which data is to be recorded. For this purpose, the data recording apparatus 140 is provided with a key-control unit 154 for operation by the user. The key-control unit 154 has provided thereon a plurality of keys such as recording start and end keys in addition to the input select keys for entry of user's selection or designation. A key-operation signal corresponding to a key operated by the user is supplied to the system controller 700.

The system controller 700 interprets the key-operation signal to judge which one of the keys has been operated and controls correspondingly to the result of judgment. Then, the system controller 700 controls the selector 145 to select and output a signal from an external input interface selected by the user.

The audio PCM signal outputted from the selector 145 is supplied to a write head 150 via a recording circuit 149 including an ECC encoder and recording modulation circuit. The write head 150 writes data to an optical disc 151. The optical disc 151 is rotated by a spindle motor 152 at a predetermined velocity under a CLV servo control of a servo circuit 153. The servo circuit 153 produces a velocity servo signal based on the audio PCM signal to be recorded for example, and supplies it to the spindle motor 152. The servo circuit 153 is supplied with a control signal from the system controller 700 to control the position of the write head 150 radially of the optical disc 151 and also in the track direction.

Figure 22:
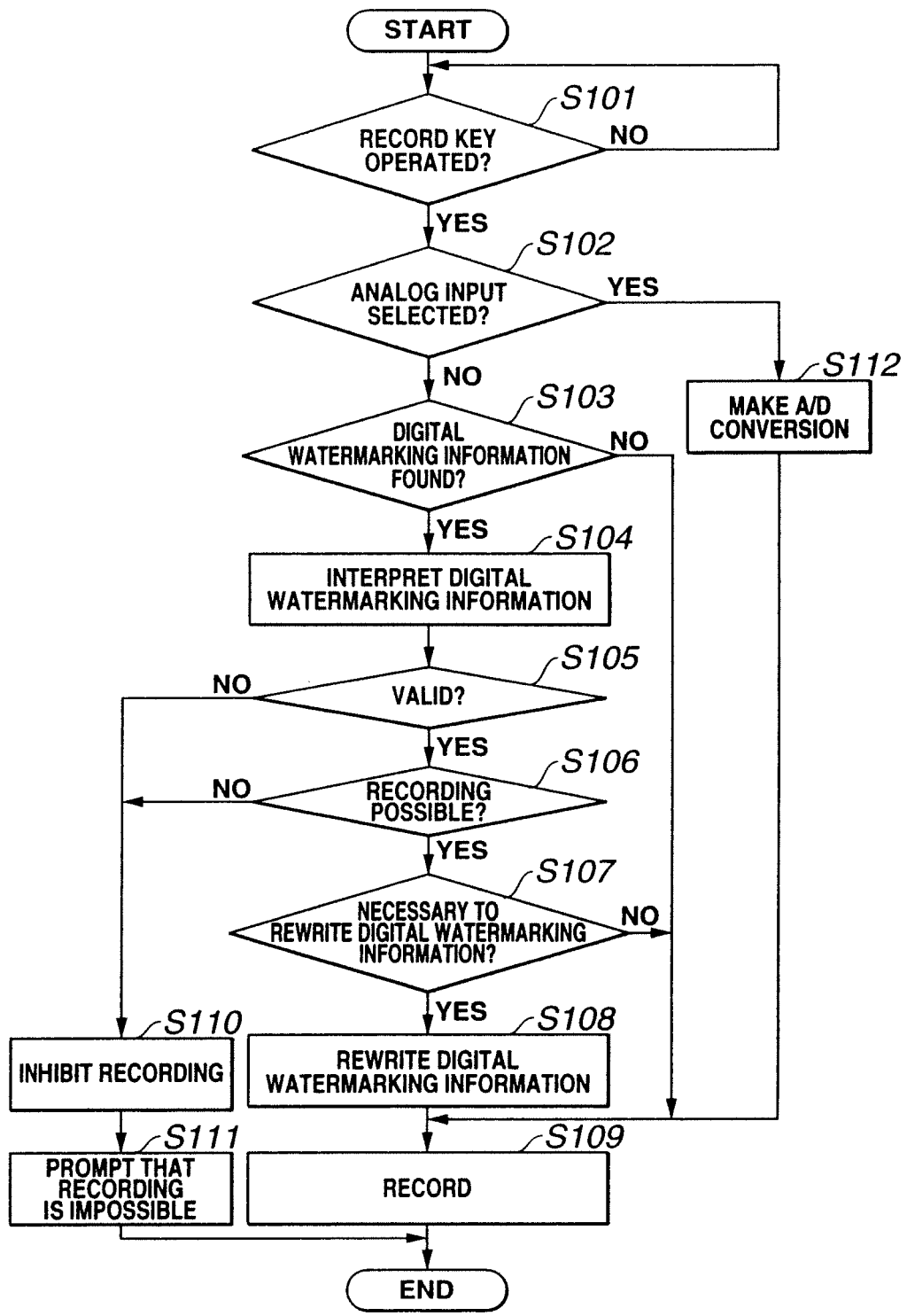
FIG. 22 is a flow chart showing operations made for data recording in the data recording apparatus shown in FIG. 21.

Next, operations made for data recording in the data recording apparatus 140 constructed as having been described above will be described with reference to the flow chart shown in FIG. 22. It should be noted that these flow chart show the operations made mainly under the control of the system controller 700.

First in step S101, the system controller 700 judges whether the record key on the key-control unit 154 has been operated. When the record key is judged to have been operated, the system controller 700 goes to step S102 where it will judge, based on the operated state of the input select key on the key-control unit 154, whether the analog input interface 142 is selected.

When it is judged in step S102 that not the analog input interface 142 but the IEC 958 interface 143 is selected, the system controller 700 goes to step S103 where it will judge whether digital watermark information is embedded in the audio PCM data to be recorded. For this judgment, the system controller 700 causes the digital watermark information detection circuit 147 to detect digital watermark information for a predetermined length of time and judges whether digital watermark information can have been detected within the predetermined length of time. When the digital watermark information can have been detected so, the system controller 700 goes to step S104 where it will interpret the digital watermark information, and goes to step S105 where it will judge whether the detected digital watermark information is valid or not. This judgment is intended to see whether the digital watermark information has been falsified to have contents which cannot normally be.

When it is judged that the detected digital watermark information is valid, the system controller 700 goes to step S106 where it will judge, according to the result of interpretation of the digital watermark information, namely, copyright management information, whether or not the recording for copying of the data is possible.

When it is judged in step S105 that the detected digital watermark information is not valid, or when it is judged in step S106 that the recording for copying is impossible, the system controller 700 goes to step S110 where it will inhibit the recording, and goes to step S111 where it will control an LCD unit 155 to prompt the user, by display, that the recording is impossible.

Also, when it is judged in step S106 that the recording for copying is possible, the system controller 700 judges in step S107 whether the digital watermark information has to be rewritten. When it is judged that the control of the recording for copying needs rewriting of the digital watermark information because the copy generation is limited or number of times copying can be done is limited, the system controller 700 will control, in step S108, the digital watermark information rewrite circuit 148 to rewrite the digital watermark information.

After completion of the digital watermark information rewriting or when it is judged that the digital watermark information has not to be rewritten, the system controller 700 goes to step S109 where the data will be recorded.

When it is judged in step S102 that the analog input interface 142 is selected, the input analog data is converted in the A/D converter 144 to audio PCM signal in step S112, and the audio PCM signal is recorded in step S109.

Note that also in this embodiment, when it is judged in step S103 that no digital watermark information can be detected, the system controller 700 goes to step S109 where the data will be recorded. This is intended because there exists a conventional content having no digital watermark information embedded therein or a content unknown as to how it has been protected against copying. However, since such a content not known as to how it has been protected against copying is also unclear as to how it has been routed, it may be inhibited from being recorded.

As having been described in the foregoing, since the data recording apparatus 140 is designed not to detect any digital watermark information when the data to be recorded is an analog data, it does not detect digital watermark information unnecessarily and thus it can work with a highly improved performance.

In the foregoing, the present invention has been recorded concerning the data recording apparatus. Also in a data playing apparatus provided with an analog input interface and digital input interface, data entered from the analog input interface can be reproduced without having to detect digital watermark information, as above. Note that the above data recording apparatus has been described in the foregoing as a solution to the problem that when digital watermark information is embedded in an audio PCM signal and the signal is converted to an analog signal, the embedded digital watermark information will be difficult to detect from the analog signal. In case digital watermark information embedded in analog data is difficult to detect when the analog data is converted to audio PCM data, the audio PCM data is not subjected to detection of digital watermark information.

In case it can be discriminated, based on the aforementioned TOC information and file header information, in which digital watermark information is embedded, analog data or PCM data, it is possible to determine, based on the result of discrimination, which is not subjected to detection of digital watermark information, analog data or audio PCM data.

[Data Recording Apparatus]

Also, when digital watermark information is embedded in a compressed audio PCM signal and the signal is converted to an audio PCM signal, the embedded digital watermark information will be difficult to detect. For example, in case audio data is compressed by the MDCT (modified discrete cosine transform) technique, digital watermark information is embedded at a one of the DCT coefficients where degradation due to the embeding of digital watermark information will not be noticeable when the date is reproduced. This is yet another embodiment of the data recording apparatus according to the present invention is a solution to this problem.

Figure 23:
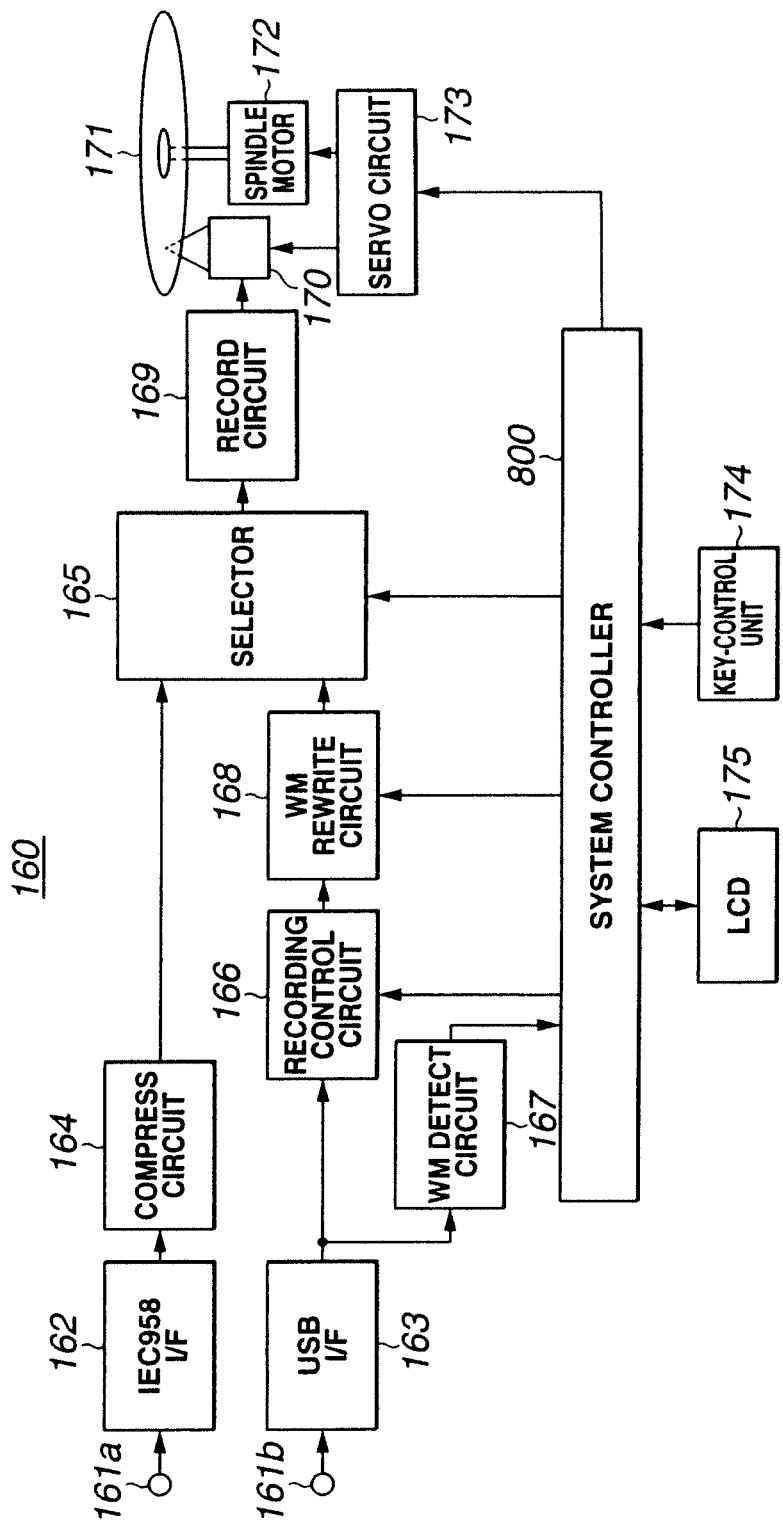
FIG. 23 is a block diagram of yet another embodiment of the data recording apparatus according to the present invention.

Referring now to FIG. 23, the data recording apparatus according to the present invention is schematically illustrated in the form of a block diagram. This data recording apparatus is generally indicated with a reference 160. In this embodiment, the storage medium used is a CD-R (compact disc-recordable), CD-RW (compact disc-rewritable) or an optical disc capable of recording with a density double that of CD-R or CD-RW.

As shown in FIG. 23, the data recording apparatus 160 is provided with a plurality of external input interfaces including an IEC 958 interface 162 and USB interface 163 in this embodiment.

The IEC 958 interface 162 receives audio PCM signal from a so-called optical digital input terminal 161a, and supplies to a compression circuit 164. The audio PCM signal is compressed in the compression circuit 164 and supplied to a selector 165. The USB interface 163 receives compressed audio data entered via an input terminal 161b formed from a connector jack, and supplies it to a recording control circuit 166, and also to a digital watermark information detection circuit 167.

When the compressed audio data from the USB interface 163 has digital watermark information embedded as additional information therein, the above digital watermark information detection circuit 167 detects the digital watermark information, and supplies the result of detection as copyright management information to a system controller 800 including a microprocessor for example.

The system controller 800 will interpret the copyright management information. When the copyright management information is interpreted to mean that the copying is inhibited, the system controller 800 will control the recording control circuit 166 to inhibit the recording. That is, the system controller 800 inhibits the recording control circuit 166 from supplying the data to the circuits downstream of the circuit 166.

Also, when the result of interpretation of the copyright management information is judged to be "one copy allowed" or "copy-free", the system controller 800 controls the recording control circuit 166 to output the compressed audio signal to the circuits downstream of the circuit 166, thereby allowing the recording for copying. The compressed audio data from the recording control circuit 166 is supplied to a digital watermark information rewrite circuit 168. Then, even if copy control information included in the copyright management information allows the recording for copying, the system controller 800 will control the digital watermark information rewrite circuit 168 to rewrite the digital watermark information from "one copy allowed" to "copy inhibited" or to a reduced number of times copy can be done when the copy generation or number of times of copying is to be limited, like "one copy allowed". When it is unnecessary to rewrite the digital watermark information, the digital watermark information rewrite circuit 168 will be bypassed or passed through. The audio PCM data from the digital watermark information rewrite circuit 168 is supplied to a selector 165.

The user selects one of the above external input interfaces from which data is to be recorded. For this purpose, the data recording apparatus 160 is provided with a key-control unit 174 for operation by the user. The key-control unit 174 has provided thereon a plurality of keys such as recording start and end keys in addition to the input select keys for entry of user's selection or designation. A key-operation signal corresponding to a key operated by the user is supplied to the system controller 800.

The system controller 800 interprets the key-operation signal to judge which one of the keys has been operated and controls correspondingly to the result of judgment. Then, the system controller 800 controls the selector 165 to select and output a signal from an external input interface selected by the user.

The audio PCM signal outputted from the selector 165 is supplied to a write head 170 via a recording circuit 169 including an ECC encoder and recording modulation circuit. The write head 170 writes data to an optical disc 171. The optical disc 171 is rotated by a spindle motor 172 at a predetermined velocity under a CLV servo control of a servo circuit 173. The servo circuit 173 produces a velocity servo signal based on the audio PCM signal to be recorded for example, and supplies it to the spindle motor 172. The servo circuit 173 is supplied with a control signal from the system controller 800 to control the position of the write head 170 radially of the optical disc 171 and also in the track direction.

Figure 24:
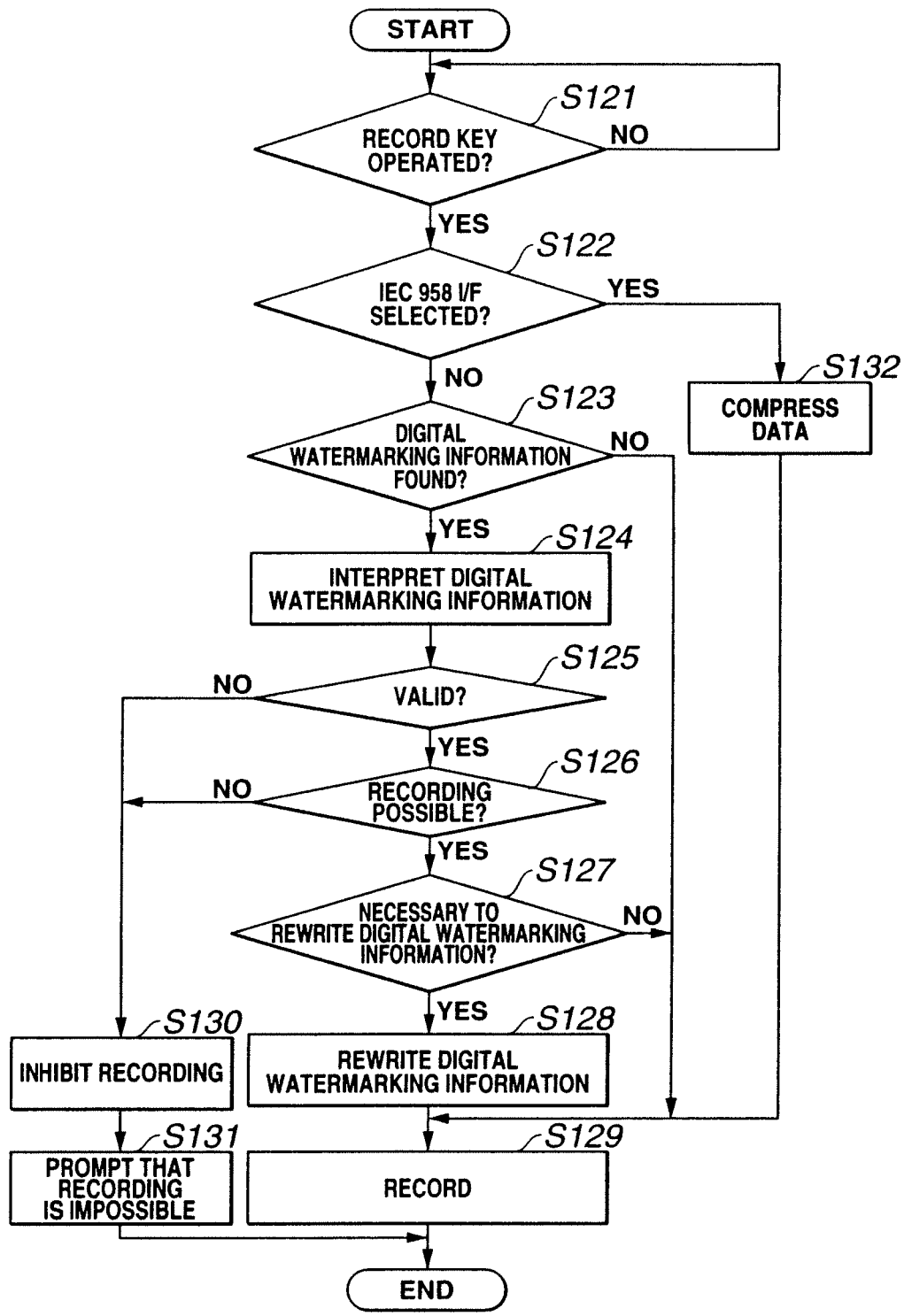
FIG. 24 is a flow chart showing operations made for data recording in the data recording apparatus shown in FIG. 23.

Next, operations made for data recording in the data recording apparatus 160 constructed as having been described above will be described with reference to the flow chart shown in FIG. 24. It should be noted that these flow chart show the operations made mainly under the control of the system controller 800.

First in step S121, the system controller 800 judges whether the record key on the key-control unit 174 has been operated. When the record key is judged to have been operated, the system controller 800 goes to step S1122 where it will judge, based on the operated state of the input select key on the key-control unit 174, whether the IEC 958 interface 162 is selected.

When it is judged in step S122 that not the IEC958 interface 162 but the USB interface 163 is selected, the system controller 800 goes to step S123 where it will judge whether digital watermark information is embedded in the compressed audio data to be recorded. For this judgment, the system controller 800 causes the digital watermark information detection circuit 167 to detect digital watermark information for a predetermined length of time and judges whether digital watermark information can have been detected within the predetermined length of time. When the digital watermark information can have been detected so, the system controller 800 goes to step S124 where it will interpret the digital watermark information, and goes to step S125 where it will judge whether the detected digital watermark information is valid or not. This judgment is intended to see whether the digital watermark information has been falsified to have contents which cannot normally be.

When it is judged that the detected digital watermark information is valid, the system controller 800 goes to step S126 where it will judge, according to the result of interpretation of the digital watermark information, namely, copyright management information, whether or not the recording for copying of the data is possible.

When it is judged in step S125 that the detected digital watermark information is not valid, or when it is judged in step S126 that the recording for copying is impossible, the system controller 800 goes to step S130 where it will inhibit the recording, and goes to step S131 where it will control an LCD unit 175 to prompt the user, by display, that the recording is impossible.

Also, when it is judged in step S126 that the recording for copying is possible, the system controller 800 judges in step S127 whether the digital watermark information has to be rewritten. When it is judged that the control of the recording for copying needs rewriting of the digital watermark information because the copy generation is limited or number of times copying can be done is limited, the system controller 800 will control, in step S128, the digital watermark information rewrite circuit 168 to rewrite the digital watermark information.

After completion of the digital watermark information rewriting or when it is judged that the digital watermark information has not to be rewritten, the system controller 800 goes to step S129 where the data will be recorded.

When it is judged in step S122 that the IEC 958 interface 162 is selected, the input PCM data is compressed in the compression circuit 164 in step S132, and the compressed audio signal is recorded in step S129.

Note that also in this embodiment, when it is judged in step S123 that no digital watermark information can be detected, the system controller 800 goes to step S129 where the data will be recorded. This is intended because there exists a conventional content having no digital watermark information embedded therein or a content unknown as to how it has been protected against copying. However, since such a content not known as to how it has been protected against copying is also unclear as to how it has been routed, it may be inhibited from being recorded.

As having been described in the foregoing, since the data recording apparatus 160 is designed not to detect any digital watermark information in any data entered from the IEC 958 interface 162 and from which it is difficult to detect digital watermark information, it does not detect digital watermark information unnecessarily and thus it can work with a highly improved performance.

In the above, the embodiment of the data recording apparatus according to the present invention has been described. However, it should be noted that a data playing apparatus provided with an IEC 958 interface and USB interface can play data from the IEC 958 interface without having to detect any digital watermark information.

Note that the above data recording apparatus has been described in the foregoing as a solution to the problem that when digital watermark information is embedded in compressed audio data and the embedded digital watermark information is difficult to detect from audio PCM data. In case digital watermark information embedded in audio PCM data is difficult to detect when the audio PCM data is compressed, the compressed audio data is not subjected to detection of digital watermark information.

In case it can be discriminated, based on the aforementioned TOC information and file header information, in which digital watermark information is embedded, compressed data or PCM data, it is possible to determine, based on the result of discrimination, which is not subjected to detection of digital watermark information, analog data or audio PCM data.

Note that it is not only in the aforementioned two embodiments of the present invention that digital watermark information is difficult to detect. For example, a TV signal converted to another TV system or changed in number of scanning lines is to be recorded, it will be difficult to detect digital watermark information having been embedded in TV signal before so converted or changed. Also in this case, such a TV signal is not subjected to detection of digital watermark information.

Other Embodiments and Variants

If there is available a means for discriminating how digital watermark information has been embedded in main data line the header information as shown in FIG. 8, it may be decided, depending upon whether digital watermark information embedded in a data, whether the digital watermark information detection circuit included in the data recording apparatus or player according to the present invention should detect the digital watermark information.

Also, if it is possible to discriminate the form of a main data in which digital watermark information is embedded (compressed, non-compressed, analog or digital form), whether input data should be subjected to detection of the digital watermark information may be decided in the data recording apparatus or player for the aforementioned situation (2) based on the result of discrimination of the form of the main data in which the digital watermark information is embedded.

When the storage medium is a CDx disc, it is possible to discriminate, based on the existence of wobbled pits, between data recorded with the use of the authoring device (recorded at pits) and data from a CDx-R or CDx-RW. This fact can be utilized to make no detection of digital watermark information in encrypted data from a CDx disc prepared with the use of the authoring device while detecting digital watermark information in data from CDx-R, CDx-RW or other disc.

Also, the type of digital watermark information may be detected from the file header and TOC information of a data, and it be judged based on the result of detection whether the digital watermark information can be detected by the digital watermark information detection circuit in the data recording apparatus or player. When the digital watermark information is judged based on the result of judgment to be a one which cannot be detected by the data recording apparatus or player, the data may not be subjected to detection of digital watermark information.

Contents include ones whose copyright should be protected more strictly and ones whose copyright may not so strictly be protected, which depends upon their types. With this fact taken in consideration, the type of a content may be detected from the file header and TOC information included in the content data and it may be decided based on the result of detection whether the content should be subjected to detection of digital watermark information.

In the aforementioned embodiments, additional data is embedded in a content by the digital watermarking. However, the present invention is applicable to additional data embedded in a content by any other technique.

In the aforementioned embodiments, audio signal is to be recorded or played. However, the present invention is not limited to such signal but can cover program data such as video data, text data and game.

Also, the storage medium is not limited to an optical disc but may be a memory card, hard disc or semiconductor memory.

INDUSTRIAL APPLICABILITY

As having been described in the foregoing, since any securely protected data is not subjected to detection of additional information embedded therein, the data recording apparatus or player according to the present invention can operate with less burden and with a higher performance. Also, in case additional information is difficult to detect depending upon the type of input data in which the additional information is embedded, the input data is not subjected to detection of the additional information. In this case, the apparatus is not burdened with the detection of additional information.

The invention claimed is:

1. A data recording apparatus comprising:
unsecure means for receiving first insecure input data and second insecure input data that includes first encrypted data and excludes a corresponding first encryption key;
secured means for receiving secure input data that includes second encrypted data and a corresponding second encryption key;
means for detecting additional information embedded only in the first insecure input data received via the unsecure means for receiving, the additional information including a number of copies authorized to be made of the first insecure input data received via the unsecure means for receiving, the means for detecting not receiving the secure input data;
means for rewriting the additional information embedded in the first insecure input data, the means for rewriting decrementing reducing the number of copies authorized to be made of the first insecure input data included in the additional information;
means for recording the first insecure input data to a storage medium; and
means for controlling the means for recording and means for rewriting according to the detected additional information.

2. The apparatus as set forth in claim 1, wherein the secure input data received via the secured means for receiving is supplied via a first route to the means for recording, and
the first insecure input data received via the unsecure means for receiving is supplied via a second route to the means for recording according to the detected additional information.

3. The data recording apparatus as set forth in claim 1, wherein the additional information is embedded in the input data by at least one of embedding at low bits of a Pulse Code Modulation (PCM) signal, embedding under a masking effect, embedding at a high-energy part of the input data, and embedding by spectrum spreading.

4. A data recording apparatus comprising:
unsecured means for receiving first insecure input data and second insecure input data that includes first encrypted data and excludes a corresponding first encryption key;
secured means for receiving secure input data that includes second encrypted data and a corresponding second encryption key;
means for detecting additional information embedded only in the first insecure input data received via the unsecure means for receiving, the means for detecting not receiving the secure input data;
means for rewriting the additional information embedded in the first insecure input data received via the unsecure means for receiving;
means for recording the first insecure input data to a storage medium; and
means for controlling the means for recording and means for rewriting according to the detected additional information; and
means for extracting copyright management information from the secure input data received via the secured means for receiving,
wherein the means for controlling controls the recording of the secure input data received via the secured means for receiving according to the copyright management information extracted by the means for extracting.

5. The apparatus as set forth in claim 1, wherein the means for rewriting rewrites the additional information according to the detected additional information embedded in the first insecure input data received via the unsecure means for receiving.

6. The apparatus as set forth in claim 1, wherein the means for detecting detects digital watermark information from the first insecure input data received via the unsecure means for receiving and the additional information from the digital watermark information.

7. A data recording/playing apparatus comprising:
means for reading data from a first storage medium;
means for discriminating a format of the read data, the format of the read data being from a group comprising secure, encrypted, compressed, analog, and digital formats;
means for detecting additional information embedded in the read data according to the result of the discrimination from the means for discriminating, the additional information including a number of copies authorized to be made of the read data;
means for recording the read data to a second storage medium;
means for rewriting the additional information embedded in the data, the means for rewriting decrementing reducing the number of copies authorized to be made of the read data included in the additional information; and
means for controlling the means for recording and the means for rewriting according to the additional information detected by the means for detecting.

8. The apparatus as set forth in claim 7, wherein the means for detecting detects the additional information from the read data when the means for discriminating judges that the format of the read data specifies that the read data is not secure, and
the means for rewriting rewrites the additional information in the read data when the means for discriminating judges that the format of the read data specifies that the read data is not secure.

9. The apparatus as set forth in claim 7, wherein the means for detecting detects digital watermark information from the read data and detects the additional information from the digital watermark information.

10. A data recording apparatus comprising:
a discriminating circuit configured to detect a data format of input data, the data format being from a group comprising: secure, encrypted, compressed, analog, and digital formats;
a watermark detection circuit configured to detect digital watermark information embedded in the input data based on the data format of the input data detected by the discriminating circuit, the digital watermark information including a number of copies authorized to be made of the input data;
a watermark rewriting circuit configured to rewrite the digital watermark information embedded in the input data, the watermark rewriting circuit decrementing reducing the number of copies authorized to be made of the input data included in the digital watermark information additional information;
a recording circuit configured to record the input data to a storage medium; and
a system controller configured to control the watermark rewriting circuit and the recording circuit according to the detected digital watermark information.

* * * * *